(12) United States Patent
Calman et al.

(10) Patent No.: US 9,773,285 B2
(45) Date of Patent: Sep. 26, 2017

(54) PROVIDING DATA ASSOCIATED WITH RELATIONSHIPS BETWEEN INDIVIDUALS AND IMAGES

(75) Inventors: Matthew A. Calman, Charlotte, NC (US); Erik Stephen Ross, Charlotte, NC (US); Alfred Hamilton, Charlotte, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 1027 days.

(21) Appl. No.: 13/342,050

(22) Filed: Jan. 1, 2012

(65) Prior Publication Data

US 2012/0229657 A1 Sep. 13, 2012

Related U.S. Application Data

(60) Provisional application No. 61/450,213, filed on Mar. 8, 2011, provisional application No. 61/478,397, filed on Apr. 22, 2011.

(51) Int. Cl.
*G06Q 10/00* (2012.01)
*G06Q 30/00* (2012.01)
*G06Q 50/00* (2012.01)

(52) U.S. Cl.
CPC .............. *G06Q 50/01* (2013.01); *G06Q 10/00* (2013.01); *G06Q 30/00* (2013.01)

(58) Field of Classification Search
CPC .... G06Q 10/00; G06Q 30/02; G06Q 30/0625; G06Q 30/0631; G06Q 30/0643
(Continued)

(56) References Cited

U.S. PATENT DOCUMENTS 5,638,457 A 6/1997 Deaton et al.
5,768,633 A 6/1998 Allen et al.
(Continued)

FOREIGN PATENT DOCUMENTS

| JP | 2007266143 A | 10/2007 |
|---|---|---|
| KR | 1020090047614 A | 5/2009 |
| KR | 1020090105734 A | 10/2009 |

OTHER PUBLICATIONS

International Searching Authority. PCT International Search Report and Written Opinion dated Feb. 5, 2013. PCT International Application No. PCT/US12/27890. Name of Applicant: Bank of America Corporation. English Language. 16 pages.
(Continued)

*Primary Examiner* — Sangeeta Bahl
(74) *Attorney, Agent, or Firm* — Michael A. Springs; Moore & Van Allen PLLC; Anup Shrinivasan

(57) ABSTRACT

In general terms, embodiments of the present invention relate to methods and apparatuses for providing information regarding relationships between individuals, who may be associated with a user of a mobile device, and objects (e.g., products, locations, businesses, etc.) identified in an image. In some embodiments, this image may be captured by a mobile device. For example, in some embodiments, a method is provided that includes: (a) receiving first information associated with an image, where the image was captured by a mobile device operated by a user; (b) receiving second information regarding one or more individuals; (c) determining, based at least partially on the first and second information, one or more relationships between information regarding individuals and information associated with the image; and (d) presenting, via the mobile device of the user, information associated with the one or more relationships.

75 Claims, 8 Drawing Sheets

(58) Field of Classification Search
USPC .......................... 705/1.1, 7.32, 26.7, 26.62
See application file for complete search history.

(56) References Cited

U.S. PATENT DOCUMENTS

| | | | |
|---|---|---|---|
| 6,055,513 A | 4/2000 | Katz et al. |
| 6,173,269 B1 | 1/2001 | Solokl et al. |
| 6,202,055 B1 | 3/2001 | Houvener et al. |
| 6,266,649 B1 | 7/2001 | Linden et al. |
| 6,522,772 B1 | 2/2003 | Morrison et al. |
| 6,533,392 B1 | 3/2003 | Koitabashi |
| 6,636,249 B1 | 10/2003 | Rekimoto |
| 6,674,993 B1 | 1/2004 | Tarbouriech |
| 6,856,965 B1 | 2/2005 | Stinson et al. |
| 6,925,196 B2 | 8/2005 | Kass et al. |
| 6,928,165 B1 | 8/2005 | Takai |
| 6,996,263 B2 | 2/2006 | Jones et al. |
| 7,016,532 B2 | 3/2006 | Boncyk et al. |
| 7,062,454 B1 | 6/2006 | Giannini et al. |
| 7,110,964 B2 | 9/2006 | Tengler et al. |
| 7,154,529 B2 | 12/2006 | Hoke et al. |
| 7,155,228 B2 | 12/2006 | Rappaport et al. |
| 7,162,438 B1 | 1/2007 | Kelly et al. |
| 7,254,552 B2 | 8/2007 | Bezos et al. |
| 7,265,779 B2 | 9/2007 | Sato et al. |
| 7,309,015 B2 | 12/2007 | Frantz et al. |
| 7,336,890 B2 | 2/2008 | Lu et al. |
| 7,403,652 B2 | 7/2008 | Boncyk et al. |
| 7,412,081 B2 | 8/2008 | Doi |
| 7,424,303 B2 | 9/2008 | Al-Sarawi |
| 7,477,780 B2 | 1/2009 | Boncyk et al. |
| 7,526,280 B2 | 4/2009 | Jung et al. |
| 7,564,469 B2 | 7/2009 | Cohen |
| 7,565,008 B2 | 7/2009 | Boncyk et al. |
| 7,615,446 B2 | 11/2009 | Kim et al. |
| 7,630,937 B1 | 12/2009 | Mo et al. |
| 7,634,448 B1 | 12/2009 | Ramachandran |
| 7,680,324 B2 | 3/2010 | Boncyk et al. |
| 7,693,585 B2 | 4/2010 | Kalan et al. |
| 7,735,728 B2 | 6/2010 | Wallerstorfer |
| 7,751,805 B2 | 7/2010 | Neven et al. |
| 7,775,437 B2 | 8/2010 | Cohen |
| 7,792,736 B2 | 9/2010 | Wasendorf, Sr. |
| 7,792,738 B2 | 9/2010 | Channell |
| 7,832,632 B2 | 11/2010 | Meek et al. |
| 7,840,031 B2 | 11/2010 | Albertson et al. |
| 7,873,710 B2 | 1/2011 | Kiley et al. |
| 7,881,243 B2 | 2/2011 | Hardy et al. |
| 7,881,529 B2 | 2/2011 | Boncyk et al. |
| 7,899,243 B2 | 3/2011 | Boncyk et al. |
| 7,899,252 B2 | 3/2011 | Boncyk et al. |
| 7,912,785 B1 | 3/2011 | Kay |
| 7,962,128 B2 | 6/2011 | Neven et al. |
| 7,970,649 B2 | 6/2011 | Wu |
| 7,983,971 B1 | 7/2011 | McLuckie et al. |
| 7,988,060 B2 | 8/2011 | Killian et al. |
| 8,049,621 B1 | 11/2011 | Egan |
| 8,121,944 B2 | 2/2012 | Norman et al. |
| 8,138,930 B1 | 3/2012 | Heath |
| 8,144,944 B2 | 3/2012 | Ishii |
| 8,145,594 B2 | 3/2012 | Geisner et al. |
| 8,149,113 B2 | 4/2012 | Diem |
| 8,154,428 B2 | 4/2012 | Do et al. |
| 8,156,115 B1 | 4/2012 | Erol et al. |
| 8,180,377 B2 | 5/2012 | Yang et al. |
| 8,184,893 B2 | 5/2012 | Calman |
| 8,189,855 B2 | 5/2012 | Opalach et al. |
| 8,190,732 B1 | 5/2012 | Cooley et al. |
| 8,233,673 B2 | 7/2012 | Britz et al. |
| 8,290,237 B2 | 10/2012 | Burks et al. |
| 8,301,501 B1 | 10/2012 | Glaeser et al. |
| 8,315,423 B1 | 11/2012 | Jing et al. |
| 8,364,015 B2 | 1/2013 | Russ et al. |
| 8,385,950 B1 | 2/2013 | Wagner et al. |
| 8,385,971 B2 | 2/2013 | Rhoads et al. |
| 8,392,450 B2 | 3/2013 | Blanchflower et al. |
| 8,438,091 B1 | 5/2013 | Berman |
| 8,438,110 B2 | 5/2013 | Calman et al. |
| 8,483,484 B2 | 7/2013 | Boncyk et al. |
| 8,547,401 B2 | 10/2013 | Mallinson et al. |
| 8,571,888 B2 | 10/2013 | Calman et al. |
| 8,582,850 B2 | 11/2013 | Calman et al. |
| 8,610,766 B2 | 12/2013 | Ding et al. |
| 8,668,498 B2 | 3/2014 | Calman et al. |
| 8,698,896 B2 | 4/2014 | Nerayoff et al. |
| 8,718,612 B2 | 5/2014 | Calman et al. |
| 8,721,337 B2 | 5/2014 | Calman et al. |
| 8,758,102 B2 | 6/2014 | Block et al. |
| 8,793,303 B2 | 7/2014 | Speicher et al. |
| 8,843,405 B1 | 9/2014 | Hartman et al. |
| 8,862,762 B1 | 10/2014 | Motrenko et al. |
| 8,892,987 B2 * | 11/2014 | Leebow ................... 715/204 |
| 2001/0022615 A1 | 9/2001 | Fernandez et al. |
| 2001/0049653 A1 | 12/2001 | Sheets |
| 2002/0006602 A1 | 1/2002 | Masters |
| 2002/0016739 A1 | 2/2002 | Ogasawara |
| 2002/0029386 A1 | 3/2002 | Robbins |
| 2002/0091607 A1 | 7/2002 | Sloan et al. |
| 2002/0124188 A1 | 9/2002 | Sherman et al. |
| 2002/0133468 A1 | 9/2002 | Mertens |
| 2003/0031358 A1 | 2/2003 | Truxa et al. |
| 2003/0063292 A1 | 4/2003 | Mostafavi |
| 2003/0064705 A1 | 4/2003 | Desiderio |
| 2003/0081934 A1 | 5/2003 | Kirmuss |
| 2003/0081935 A1 | 5/2003 | Kirmuss |
| 2003/0095688 A1 | 5/2003 | Kirmuss |
| 2004/0015983 A1 | 1/2004 | Lemmons |
| 2004/0021584 A1 | 2/2004 | Hartz, Jr. et al. |
| 2004/0024709 A1 | 2/2004 | Yu et al. |
| 2004/0068751 A1 | 4/2004 | Basawapatna et al. |
| 2004/0088228 A1 | 5/2004 | Mercer et al. |
| 2004/0170392 A1 | 9/2004 | Lu et al. |
| 2004/0172285 A1 | 9/2004 | Gibson |
| 2004/0208372 A1 | 10/2004 | Boncyk et al. |
| 2004/0229611 A1 | 11/2004 | Chun |
| 2004/0243468 A1 | 12/2004 | Cohagan et al. |
| 2005/0018216 A1 | 1/2005 | Barsness et al. |
| 2005/0020359 A1 | 1/2005 | Ackley et al. |
| 2005/0052549 A1 | 3/2005 | Schinner et al. |
| 2005/0131585 A1 | 6/2005 | Luskin et al. |
| 2005/0137958 A1 | 6/2005 | Huber et al. |
| 2005/0162523 A1 | 7/2005 | Darrell et al. |
| 2005/0201510 A1 | 9/2005 | Mostafavi |
| 2005/0246457 A1 | 11/2005 | Parry et al. |
| 2005/0261987 A1 | 11/2005 | Bezos et al. |
| 2006/0002607 A1 | 1/2006 | Boncyk et al. |
| 2006/0100897 A1 | 5/2006 | Halloran, Jr. et al. |
| 2006/0100951 A1 | 5/2006 | Mylet et al. |
| 2006/0161390 A1 | 7/2006 | Namaky et al. |
| 2006/0176516 A1 | 8/2006 | Rothschild |
| 2006/0218097 A1 | 9/2006 | Walker et al. |
| 2006/0227998 A1 | 10/2006 | Hobgood et al. |
| 2006/0229936 A1 | 10/2006 | Cahill |
| 2006/0229981 A1 | 10/2006 | Crites |
| 2006/0240862 A1 | 10/2006 | Neven et al. |
| 2006/0253329 A1 | 11/2006 | Haines et al. |
| 2007/0088746 A1 | 4/2007 | Baker |
| 2007/0096886 A1 | 5/2007 | Lich et al. |
| 2007/0116299 A1 | 5/2007 | Vanderwall et al. |
| 2007/0140595 A1 | 6/2007 | Taylor et al. |
| 2007/0142091 A1 | 6/2007 | Gasborro et al. |
| 2007/0159522 A1 | 7/2007 | Neven |
| 2007/0162942 A1 | 7/2007 | Hamynen et al. |
| 2007/0162971 A1 | 7/2007 | Blom et al. |
| 2007/0185795 A1 | 8/2007 | Petrime et al. |
| 2007/0240186 A1 | 10/2007 | Silver et al. |
| 2007/0241183 A1 | 10/2007 | Brown et al. |
| 2007/0260486 A1 | 11/2007 | Urich et al. |
| 2007/0279521 A1 | 12/2007 | Cohen |
| 2007/0294721 A1 | 12/2007 | Haeuser et al. |
| 2007/0294738 A1 | 12/2007 | Kuo et al. |
| 2008/0030580 A1 | 2/2008 | Kashiwa et al. |
| 2008/0040278 A1 | 2/2008 | DeWitt |
| 2008/0070198 A1 | 3/2008 | Dempsey |

(56) References Cited

U.S. PATENT DOCUMENTS

| | | |
|---|---|---|
| 2008/0070546 A1 | 3/2008 | Lee |
| 2008/0077882 A1 | 3/2008 | Kramer et al. |
| 2008/0120639 A1 | 5/2008 | Walter et al. |
| 2008/0148320 A1 | 6/2008 | Howcroft |
| 2008/0183678 A1 | 7/2008 | Weston et al. |
| 2008/0183819 A1 | 7/2008 | Gould et al. |
| 2008/0192048 A1 | 8/2008 | Nabais Nobre |
| 2008/0195460 A1 | 8/2008 | Varghese |
| 2008/0210753 A1 | 9/2008 | Plozay et al. |
| 2008/0214210 A1 | 9/2008 | Rasanen et al. |
| 2008/0223918 A1 | 9/2008 | Williams et al. |
| 2008/0230603 A1 | 9/2008 | Stawar et al. |
| 2008/0243721 A1 | 10/2008 | Joao |
| 2008/0252723 A1 | 10/2008 | Park |
| 2008/0267447 A1 | 10/2008 | Kelusky et al. |
| 2008/0268876 A1 | 10/2008 | Gelfand et al. |
| 2008/0272914 A1 | 11/2008 | Murray et al. |
| 2008/0307307 A1 | 12/2008 | Ciudad et al. |
| 2009/0005010 A1 | 1/2009 | Dote et al. |
| 2009/0006191 A1 | 1/2009 | Arankalle et al. |
| 2009/0017930 A1 | 1/2009 | Burnett et al. |
| 2009/0055205 A1 | 2/2009 | Nguyen et al. |
| 2009/0061949 A1 | 3/2009 | Chen |
| 2009/0070228 A1 | 3/2009 | Ronen |
| 2009/0089131 A1 | 4/2009 | Moukas et al. |
| 2009/0094125 A1 | 4/2009 | Killian et al. |
| 2009/0102859 A1* | 4/2009 | Athsani ............... G06F 3/011 345/619 |
| 2009/0106317 A1 | 4/2009 | Letendre-Hedlund |
| 2009/0112744 A1 | 4/2009 | Park et al. |
| 2009/0121271 A1 | 5/2009 | Son et al. |
| 2009/0140839 A1 | 6/2009 | Bishop et al. |
| 2009/0144164 A1 | 6/2009 | Wane et al. |
| 2009/0162746 A1 | 6/2009 | Honda |
| 2009/0171650 A1 | 7/2009 | Norman |
| 2009/0171778 A1 | 7/2009 | Powell |
| 2009/0171850 A1 | 7/2009 | Yuval |
| 2009/0181640 A1 | 7/2009 | Jones |
| 2009/0182748 A1 | 7/2009 | Walker |
| 2009/0185241 A1 | 7/2009 | Nepomniachtchi |
| 2009/0202114 A1 | 8/2009 | Morin et al. |
| 2009/0204511 A1 | 8/2009 | Tsang |
| 2009/0237546 A1 | 9/2009 | Bloebaum et al. |
| 2009/0250515 A1 | 10/2009 | Todd et al. |
| 2009/0251963 A1 | 10/2009 | Seol et al. |
| 2009/0254440 A1 | 10/2009 | Pharris |
| 2009/0254467 A1 | 10/2009 | Camp, Jr. |
| 2009/0285444 A1 | 11/2009 | Erol et al. |
| 2009/0287587 A1 | 11/2009 | Bloebaum et al. |
| 2009/0299857 A1 | 12/2009 | Brubaker |
| 2009/0322671 A1 | 12/2009 | Scott et al. |
| 2010/0002204 A1 | 1/2010 | Jung et al. |
| 2010/0034468 A1 | 2/2010 | Boncyk et al. |
| 2010/0060739 A1 | 3/2010 | Salazar |
| 2010/0070365 A1 | 3/2010 | Siotia et al. |
| 2010/0100253 A1 | 4/2010 | Fausak et al. |
| 2010/0103241 A1 | 4/2010 | Linaker |
| 2010/0130226 A1 | 5/2010 | Arrasvuori et al. |
| 2010/0138037 A1 | 6/2010 | Adelberg et al. |
| 2010/0169336 A1 | 7/2010 | Eckhoff-Hornback et al. |
| 2010/0185529 A1 | 7/2010 | Chesnut et al. |
| 2010/0217651 A1 | 8/2010 | Crabtree et al. |
| 2010/0223165 A1 | 9/2010 | Calman et al. |
| 2010/0228558 A1 | 9/2010 | Corcoran et al. |
| 2010/0228776 A1 | 9/2010 | Melkote et al. |
| 2010/0250581 A1 | 9/2010 | Chau |
| 2010/0255795 A1 | 10/2010 | Rubinsky et al. |
| 2010/0257448 A1 | 10/2010 | Squires |
| 2010/0260373 A1 | 10/2010 | Neven et al. |
| 2010/0268629 A1 | 10/2010 | Ross et al. |
| 2010/0277412 A1 | 11/2010 | Pryor |
| 2010/0281432 A1 | 11/2010 | Geisner et al. |
| 2010/0283630 A1 | 11/2010 | Alonso |
| 2010/0302361 A1 | 12/2010 | Yoneyama et al. |
| 2010/0306712 A1 | 12/2010 | Snook et al. |
| 2010/0306715 A1 | 12/2010 | Geisner et al. |
| 2010/0309225 A1 | 12/2010 | Gray et al. |
| 2011/0022540 A1 | 1/2011 | Stern et al. |
| 2011/0034176 A1 | 2/2011 | Lord et al. |
| 2011/0077046 A1 | 3/2011 | Durand et al. |
| 2011/0079639 A1 | 4/2011 | Khan |
| 2011/0081952 A1 | 4/2011 | Song et al. |
| 2011/0091092 A1 | 4/2011 | Nepomniachtchi et al. |
| 2011/0098029 A1 | 4/2011 | Rhoads et al. |
| 2011/0106622 A1 | 5/2011 | Kuhlman et al. |
| 2011/0106845 A1 | 5/2011 | Lipson et al. |
| 2011/0113343 A1 | 5/2011 | Trauth |
| 2011/0119155 A1 | 5/2011 | Hammad et al. |
| 2011/0145093 A1* | 6/2011 | Paradise et al. ............ 705/26.41 |
| 2011/0153341 A1 | 6/2011 | Diaz-Cortes |
| 2011/0153402 A1 | 6/2011 | Craig |
| 2011/0157357 A1 | 6/2011 | Weisensale et al. |
| 2011/0164163 A1 | 7/2011 | Bilbrey et al. |
| 2011/0183732 A1 | 7/2011 | Block et al. |
| 2011/0191372 A1 | 8/2011 | Kaushansky et al. |
| 2011/0202460 A1 | 8/2011 | Buer et al. |
| 2011/0202466 A1 | 8/2011 | Carter |
| 2011/0252311 A1 | 10/2011 | Kay et al. |
| 2011/0258121 A1 | 10/2011 | Kauniskangas et al. |
| 2011/0280450 A1 | 11/2011 | Nepomniachtchi et al. |
| 2011/0282821 A1* | 11/2011 | Levy et al. ............... 706/47 |
| 2011/0317008 A1 | 12/2011 | Sam |
| 2011/0318717 A1 | 12/2011 | Adamowicz |
| 2012/0013770 A1 | 1/2012 | Stafford et al. |
| 2012/0066026 A1 | 3/2012 | Dusig et al. |
| 2012/0075450 A1 | 3/2012 | Ding et al. |
| 2012/0095853 A1 | 4/2012 | von Bose et al. |
| 2012/0098977 A1 | 4/2012 | Striemer et al. |
| 2012/0099756 A1 | 4/2012 | Sherman et al. |
| 2012/0100915 A1 | 4/2012 | Margalit et al. |
| 2012/0140068 A1 | 6/2012 | Monroe et al. |
| 2012/0179609 A1 | 7/2012 | Agarwal et al. |
| 2012/0179665 A1 | 7/2012 | Baarman et al. |
| 2012/0190455 A1 | 7/2012 | Briggs |
| 2012/0229624 A1 | 9/2012 | Calman et al. |
| 2012/0229625 A1 | 9/2012 | Calman et al. |
| 2012/0229629 A1 | 9/2012 | Blumstein-Koren et al. |
| 2012/0229647 A1 | 9/2012 | Calman et al. |
| 2012/0230538 A1 | 9/2012 | Calman et al. |
| 2012/0230539 A1 | 9/2012 | Calman et al. |
| 2012/0230540 A1 | 9/2012 | Calman et al. |
| 2012/0230548 A1 | 9/2012 | Calman et al. |
| 2012/0230557 A1 | 9/2012 | Calman et al. |
| 2012/0230577 A1 | 9/2012 | Calman et al. |
| 2012/0231424 A1 | 9/2012 | Calman et al. |
| 2012/0231425 A1 | 9/2012 | Calman et al. |
| 2012/0231814 A1 | 9/2012 | Calman et al. |
| 2012/0231840 A1 | 9/2012 | Calman et al. |
| 2012/0232937 A1 | 9/2012 | Calman et al. |
| 2012/0232954 A1 | 9/2012 | Calman et al. |
| 2012/0232966 A1 | 9/2012 | Calman et al. |
| 2012/0232968 A1 | 9/2012 | Calman et al. |
| 2012/0232976 A1 | 9/2012 | Calman et al. |
| 2012/0232977 A1 | 9/2012 | Calman et al. |
| 2012/0232993 A1 | 9/2012 | Calman et al. |
| 2012/0233003 A1 | 9/2012 | Calman et al. |
| 2012/0233015 A1 | 9/2012 | Calman et al. |
| 2012/0233025 A1 | 9/2012 | Calman et al. |
| 2012/0233032 A1 | 9/2012 | Calman et al. |
| 2012/0233033 A1 | 9/2012 | Calman et al. |
| 2012/0233070 A1 | 9/2012 | Calman et al. |
| 2012/0233072 A1 | 9/2012 | Calman et al. |
| 2012/0233089 A1 | 9/2012 | Calman et al. |
| 2012/0265679 A1 | 10/2012 | Calman et al. |
| 2012/0265809 A1 | 10/2012 | Hanson et al. |
| 2012/0287278 A1 | 11/2012 | Danis |
| 2012/0299961 A1 | 11/2012 | Ramkumar et al. |
| 2012/0313781 A1 | 12/2012 | Barker et al. |
| 2012/0320248 A1 | 12/2012 | Igarashi |
| 2012/0330753 A1 | 12/2012 | Urbanski et al. |
| 2013/0011111 A1 | 1/2013 | Abraham et al. |
| 2013/0031202 A1 | 1/2013 | Mick et al. |
| 2013/0033522 A1 | 2/2013 | Calman et al. |
| 2013/0036050 A1 | 2/2013 | Giordano et al. |

(56) References Cited

U.S. PATENT DOCUMENTS

| | | |
|---|---|---|
| 2013/0046589 A1 | 2/2013 | Grigg et al. |
| 2013/0046602 A1 | 2/2013 | Grigg et al. |
| 2013/0046603 A1 | 2/2013 | Grigg et al. |
| 2013/0054367 A1 | 2/2013 | Grigg et al. |
| 2013/0103608 A1 | 4/2013 | Scipioni et al. |
| 2013/0114877 A1 | 5/2013 | Meek et al. |
| 2013/0116855 A1 | 5/2013 | Nielsen et al. |
| 2013/0155474 A1 | 6/2013 | Roach et al. |
| 2013/0156317 A1 | 6/2013 | Calman |
| 2013/0182010 A2 | 7/2013 | Schoeller et al. |
| 2013/0259313 A1 | 10/2013 | Breed et al. |
| 2014/0006259 A1 | 1/2014 | Grigg et al. |
| 2014/0098993 A1 | 4/2014 | Boncyk et al. |
| 2014/0219566 A1 | 8/2014 | Rodriguez et al. |

OTHER PUBLICATIONS

International Bureau of WIPO. PCT International Preliminary Report on Patentability and Written Opinion dated Feb. 13, 2014. PCT International Application No. PCT/US2012/048697. Name of Applicant: Bank of America Corporation et al. English Language. 7 pages.

International Searching Authority. PCT International Search Report and Written Opinion dated Sep. 24, 2012. PCT International Application No. PCT/US12/48697. Name of Applicant: Bank of America Corporation. English Language. 14 pages.

International Preliminary Report on Patentability for International Patent Application No. PCT/US2012/027892 dated Sep. 10, 2013.

International Preliminary Report on Patentability for International Patent Application No. PCT/US2012/027890 dated Sep. 10, 2013.

International Preliminary Report on Patentability for International Patent Application No. PCT/US2012/028036 dated Sep. 10, 2013.

International Preliminary Report on Patentability for International Patent Application No. PCT/US2012/028008 dated Sep. 10, 2013.

International Preliminary Report on Patentability for International Patent Application No. PCT/US2012/027912 dated Sep. 10, 2013.

International Searching Authority. PCT International Search Report and Written Opinion dated May 28, 2012. PCT International Application No. PCT/US12/28036. Name of Applicant: Bank of America Corporation. English Language. 11 pages.

International Searching Authority. PCT International Search Report and Written Opinion dated May 22, 2012. PCT International Application No. PCT/US12/28008. Name of Applicant: Bank of America Corporation. English Language. 13 pages.

International Searching Authority. PCT International Search Report and Written Opinion dated Jun. 14, 2012. PCT International Application No. PCT/US12/27892. Name of Applicant: Bank of America Corporation. English Language. 19 pages.

International Searching Authority. PCT International Search Report and Written Opinion dated Jun. 8, 2012. PCT International Application No. PCT/US2012/027912. Name of Applicant: Bank of America Corporation. English Language. 12 pages.

Brody, A B (1999), Pocket Bargain Finder: A Handheld Device for Augmented Commerce. Handheld and Ubiquitous Computing, First International Symposium, HUC'99 Karlsruhe, Germany, Sep. 27-29, 1999 Proceedings, pp. 44-51. Retrieved from https://search.proquest.com/professional/docview/729929360/briefcitation/1510901369B4C70B903/3?accountid=142257.

K.J. Jeevan & P. Padhi (2006). A Selective Review of Research in Content Personalization. Library Review, 55(9), 556-586. doi:http://dx.doi.org/10.1108/00242530610706761.

M.J. Welch (2010). Addressing the Challenges in Underspecification in Web Search. (Order No. 3446833, University of California, Los Angeles). ProQuest Dissertations and Theses; 137; retrieved from http://search.prognest.com/docview/858101500?accountid=14753. (858101500).

P.A. Lessner (2007). Chi-thinking. Chiasmus and Cognition. (Order No. 3297307, University of Maryland, College Park). ProQuest Dissertations and Theses; 487; retrieved from http://search.proquest.com/docview/304851937?accountid=4753. (304851937).

Hollmer, M. (Mar. 18, 2004) MIT kicks off annual $50K business plan competition. The Boston Business Journal, 24, 24. Retrieved from http://search.proquest.com/docview/216355359?accountid=14753.

F. Zhou, H.B.-L. Duh, and M. Billinghurst, "Trends in Augmented Reality Tracking, Interaction and Display: A Review of Ten Years of ISMAR," Proc. Seventh IEEE and ACM Intl Symp. Mixed and Augmented Reality (ISMAR '08), pp. 193-202, Sep. 2008.

Squire, Kurt, and Eric Klopfer. "Augmented reality simulations on handheld computers." The journal of the learning sciences 16.3 (2007): 371-413.

Edwards, Lin. "Augmented Reality Systems Appearing in Japanese Shopping Malls." Phys Org, Dec. 9, 2009. (http://phys.org/news/2009-12-augmented-reality-japanese-malls.html).

Zhu, Wei, et al. "Design of the PromoPad: An Automated Augmented-Reality Shopping Assistant." Journal of Organizational and End User Computing, vol. 20, No. 3, 2008., pp. 41-56. (http://search.proquest.com/docview/199899751?accountid=14753).

Jayne O'Donnell and Christine Dugas. More retailers go for green—the eco kind; Home Depot tags friendly products: [Final Edition] USA Today [McLean, Va] Apr. 18, 2007: B.3.

\* cited by examiner

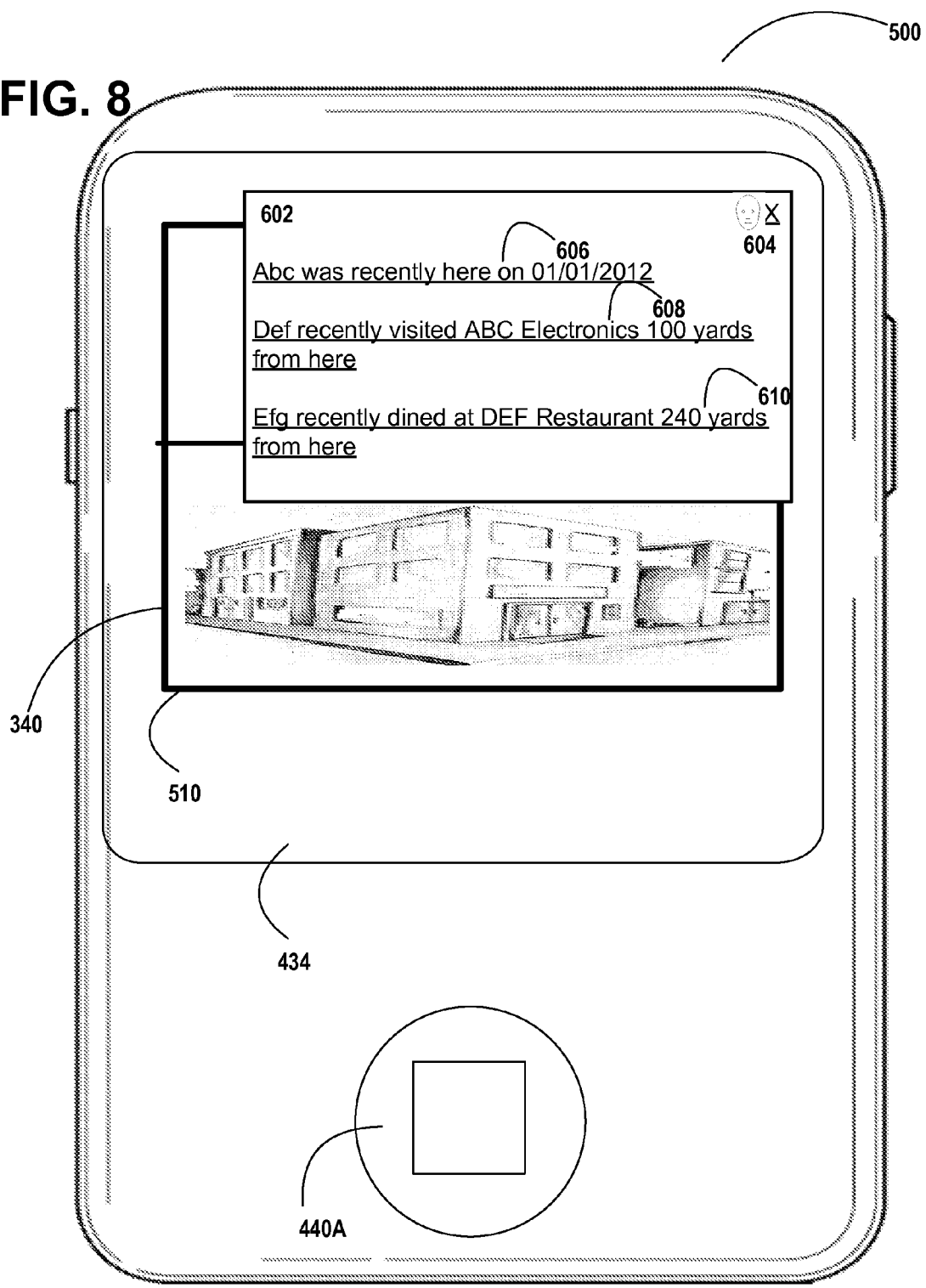

PROVIDING DATA ASSOCIATED WITH RELATIONSHIPS BETWEEN INDIVIDUALS AND IMAGES

CROSS-REFERENCE TO RELATED APPLICATIONS

This application claims priority to U.S. Provisional Patent Application Ser. No. 61/450,213, filed Mar. 8, 2011, entitled "Real-Time Video Image Analysis Applications for Commerce Activity," and U.S. Provisional Patent Application Ser. No. 61/478,397, filed Apr. 22, 2011, entitled "Providing Data Associated with Relationships between Individuals and Images," the entirety of each of which is incorporated herein by reference.

BACKGROUND

Modern handheld mobile devices, such as smart phones or the like, combine multiple technologies to provide the user with a vast array of capabilities. For example, many smart phones are equipped with significant processing power, sophisticated multi-tasking operating systems, and high-bandwidth Internet connection capabilities. Moreover, such devices often have addition features that are becoming increasing more common and standardized features. Such features include, but are not limited to, location-determining devices, such as Global Positioning System (GPS) devices; sensor devices, such as accelerometers; and high-resolution video cameras.

As the hardware capabilities of such mobile devices have increased, so too have the applications (i.e., software) that rely on the hardware advances. One such example of innovative software is a category known as augmented reality (AR), or more generally referred to as mediated reality. One such example of an AR application platform is Layar, available from Layar, Amsterdam, the Netherlands.

The Layar platform technology analyzes location data, compass direction data, and the like in combination with information related to the objects, locations or the like in the video stream to create browse-able "hot-spots" or "tags" that are superimposed on the mobile device display, resulting in an experience described as "reality browsing". One purpose for which "reality browsing" would prove advantageous is assisting an individual to identify products, locations, businesses, etc. that are associated with the likes, dislikes, interests, hobbies, preferences, purchases, etc. of other individuals such as the individual's friends, family, colleagues, neighbors, etc.

An individual's likes, dislikes, interests, hobbies, preferences, purchases, etc. are usually influenced by other individuals, e.g., the individual's friends, family, colleagues, neighbors, etc. Therefore, a need exists to implement real-time video analysis, i.e., AR or the like, to assist a user of mobile devices with the identification of products, locations, businesses, etc. that are associated with the likes, dislikes, interests, hobbies, preferences, purchases, etc. of other individuals such as the individual's friends, family, colleagues, neighbors, etc.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In general terms, embodiments of the present invention relate to methods and apparatuses for providing information regarding relationships between individuals, who may be associated with a user of a mobile device, and objects (e.g., products, locations, businesses, etc.) identified in an image. In some embodiments, this image is captured by a mobile device, while in other embodiments, the image may be obtained from any other source. For example, in some embodiments, a method is provided that includes: (a) receiving information associated with an image, where the image was captured by a mobile device operated by a user; (b) receiving information regarding individuals; (c) determining, based at least partially on the received information, one or more relationships between information regarding individuals and information associated with the image; and (d) presenting, via the mobile device of the user, information regarding the one or more relationships. In some embodiments, the present invention may relate to an augmented reality environment.

One or more processes of the various method embodiments described herein may be executed via a computing device processor. Embodiments of the invention also provide an apparatus for providing information regarding relationships between individuals, who may be associated with a user of a mobile device, and objects (e.g., products, locations, businesses, etc.) identified in an image captured by the mobile device. The apparatus includes a computing platform including at least one processor and a memory. The apparatus also includes a module, or more than one module, stored in the memory, executable by a processor, and configured to execute the various embodiments of the method described herein. Embodiments of the invention also provide a computer program product for providing information regarding relationships between individuals, who may be associated with a user of a mobile device, and objects (e.g., products, locations, businesses, etc.) identified in an image captured by the mobile device. The computer program product includes a non-transitory computer-readable medium including a set of codes for causing a computer to execute the various embodiments of the method described above.

In some embodiments, the image is part of a real-time video stream. For example, in some embodiments, the method includes positioning a mobile device such that an object is within the field of view of the mobile device's digital video recorder. In some embodiments, the image is single frame from a continuous stream of images, where the continuous stream includes a video stream captured by a digital video recorder. In some embodiments, the image is part of a video stream that is not captured in real time. In some other embodiments, the image is a still image captured by a digital camera. Thus, in some embodiments, the method includes positioning a mobile device such that an object is within the field of view of the mobile device's digital camera. In some embodiments of the invention, the mobile device captures an image by using digital camera functionality. In some other embodiments of the invention, the mobile device captures an image by using digital video recording functionality.

In some embodiments, the information associated with the image is any type of information. In some other embodiments, the information associated with the image is the image itself. In yet some other embodiments, the information associated with the image is metadata, which could be decoded into the image or stored elsewhere. In some embodiments, the information associated with an image could be the results of any analysis of the image (e.g., image comparison analysis, pattern recognition analysis or image recognition analysis). In another embodiment of the invention, information associated with an image could be the output of any modeling or composite imaging processes that are based in part on the image. In yet another embodiment, information associated with an image could be information concerning an "object" depicted in an image. As used herein, an object may be a product, a location, a business, etc.

In some embodiments, the information regarding individuals generally means information regarding friends, family, neighbors, colleagues, acquaintances that are identified through one or more social networks associated with the user, electronic contact lists or electronic address books associated with the user, or other input provided by the user. In some embodiments, the individuals are automatically identified by the apparatus based at least partially on data received from one or more social networks associated with the user, contact lists associated with the user's mobile device or the user's email inbox, etc. In some embodiments, the apparatus allows a user to input a person's name, regardless of whether that person is actually associated with the user (e.g., the user may input the name of an individual known to the user, or the user may input the name of a celebrity or someone completely unknown to the user, or the user may input the name of a person that the user knows but is not acquainted with, etc.). In some embodiments, the apparatus allows a user to receive information about the individuals from one or more social networks, one or more messaging networks (e.g., blogging or micro-blogging network), financial institution systems, etc.

Additionally, further embodiments of invention provide for determining whether the information (may be referred to as "first information") associated with the image is related to the information (may be referred to as "second information") associated with one or more individuals that may be associated with the user. As used herein, the phrase "related to" may mean that an individual has engaged in a transaction associated with the object (e.g., purchase or return of a product), has written something about the object (e.g., blog post or message on a social network about a product, business, location, etc.), has previously visited the object (e.g., a location or a business), or the like. Thus the phrase "related to" should be afforded the broadest interpretation possible and may capture other embodiments not described herein. In some embodiments, the apparatus may utilize one or more methods, such as comparison or pattern recognition algorithms, to analyze first information associated with an image, analyze second information associated with one or more individuals, and compare the first information with the second information. If the first information associated with the image matches second information associated with one or more individuals, either exactly or with a certain degree of confidence, then the apparatus determines that a relationship exists between an object and an individual.

In some embodiments, when the apparatus determines a relationship exists between an object and an individual, the apparatus may present to the user information regarding this relationship. In alternate embodiments, the apparatus may present an indicator on the mobile device display to indicate that there is a relationship between an object and an individual. In some embodiments of the invention, the presenting an indicator, which is sometimes referred to as a 'relationship' indicator, associated with the object includes displaying the indicator on a display of the mobile device. In some embodiments, the presenting an indicator associated with the object includes superimposing the indicator over a real-time video stream that is captured by the mobile device. In yet some other embodiments, the presenting an indicator associated with the object includes transmitting a still image of the object to the mobile device, where the still image includes the indicator.

In some embodiments of the invention, the indicator may be an icon, menu, tab, link, graphic or image, that is displayed on the display of a mobile device. In some embodiments of the invention, the indicator may include a border that surrounds a depiction of the object on the mobile device display. In some embodiments of the invention, the indicator may be selectable by a user. In some embodiments, the indicator, upon being selected, provides the relationship information.

In some embodiments of the invention, a method is provided that includes determining if the user of a mobile device or if other individuals associated with this user previously purchased a product depicted in the image or made a transaction with a business depicted in the image by reviewing bank or other financial institution information. In some other embodiments, the method includes accessing and retrieving transaction information (including purchases and returns) and electronic banking information of the user or other individuals from a merchant or financial institution.

In accordance with embodiments described herein, a "financial institution" may be defined as any organization, entity, or the like in the business of moving, investing, or lending money, dealing in financial instruments, or providing financial services. This may include commercial banks, thrifts, federal and state savings banks, savings and loan associations, credit unions, investment companies, insurance companies and the like. In accordance with embodiments described herein, an "account" may be the relationship that an individual or a first entity such as a business organization, hereinafter referred to as the "client" or "account holder", has with a second entity, which may be a financial institution. This account may be a credit account such that the account holder has a repayment or delivery obligation towards a second entity under previously agreed upon terms and conditions.

In accordance with embodiments described herein, the term "module" with respect to a system may refer to a hardware component of the system, a software component of the system, or a component of the system that includes both hardware and software (i.e., firmware). To the accomplishment of the foregoing and related ends, the one or more embodiments include the features hereinafter fully described and particularly pointed out in the claims. The following description and the annexed drawings set forth in detail certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Figure 1:
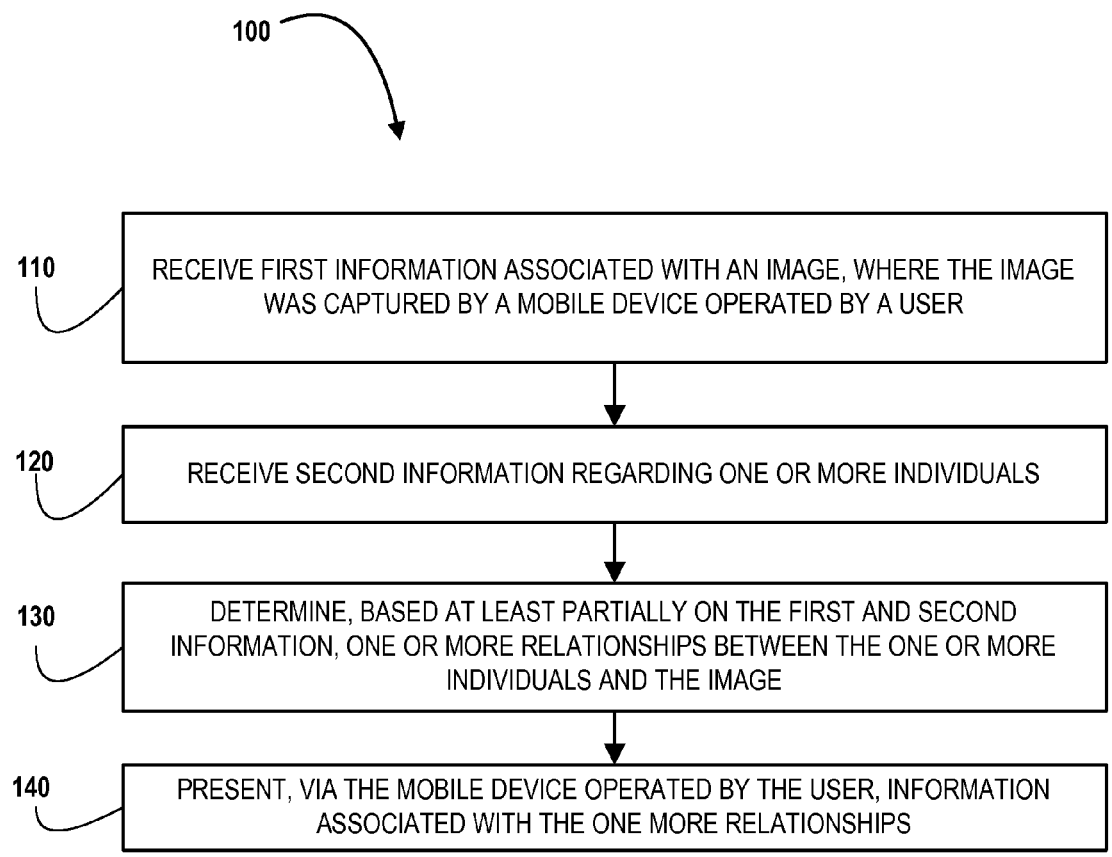

Having thus described some embodiments of the present invention in general terms, reference will now be made to the accompanying drawings, where:

FIG. 1 is a flow diagram illustrating a process flow for providing information regarding relationships between one or more individuals associated with a user of a mobile device and information associated with an image, in accordance with an embodiment of the present invention.

Figure 2:
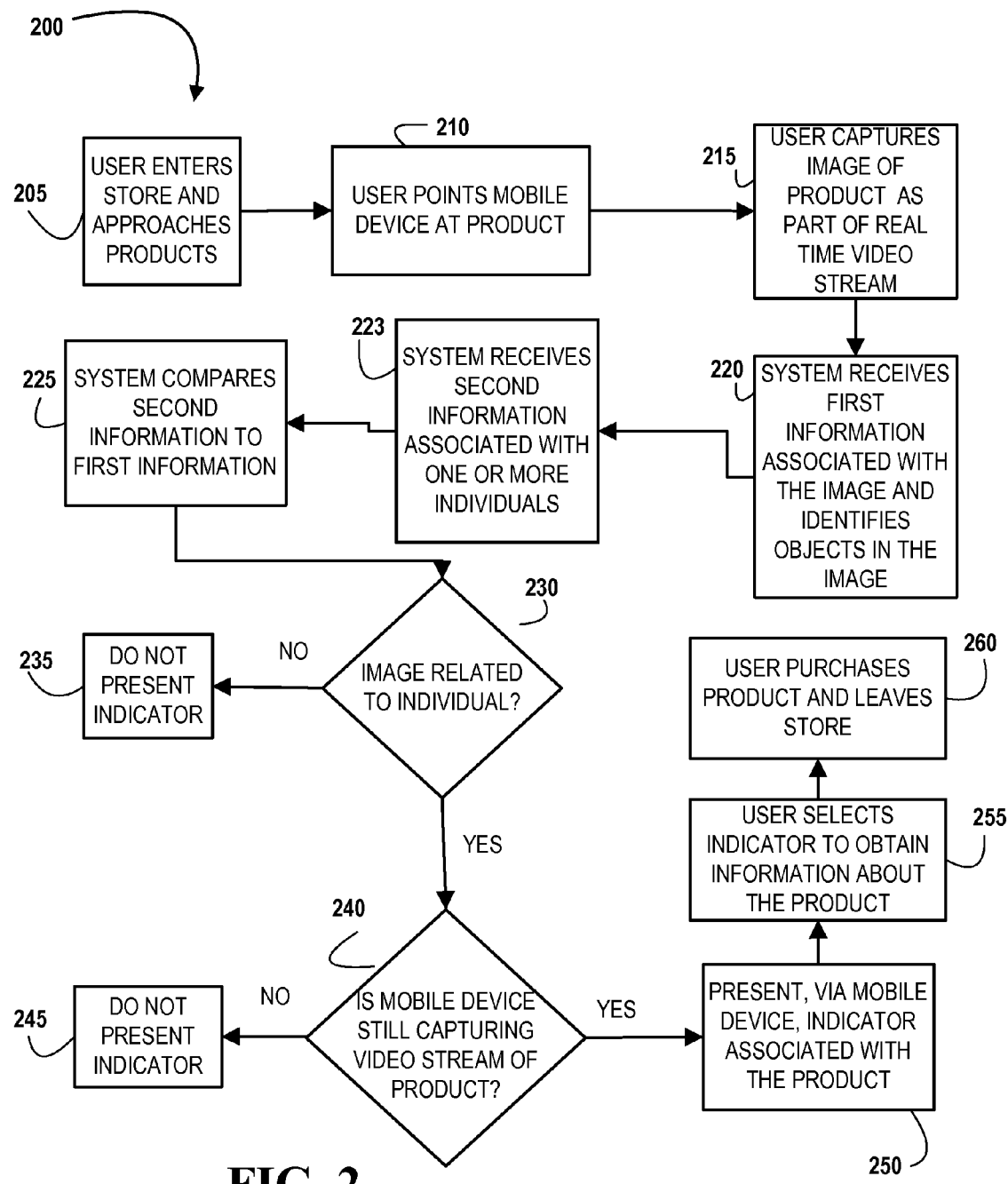

FIG. 2 is another flow diagram illustrating a process flow for providing information regarding relationships between one or more individuals associated with a user of a mobile device and information associated with an image, in accordance with an embodiment of the present invention.

Figure 3:
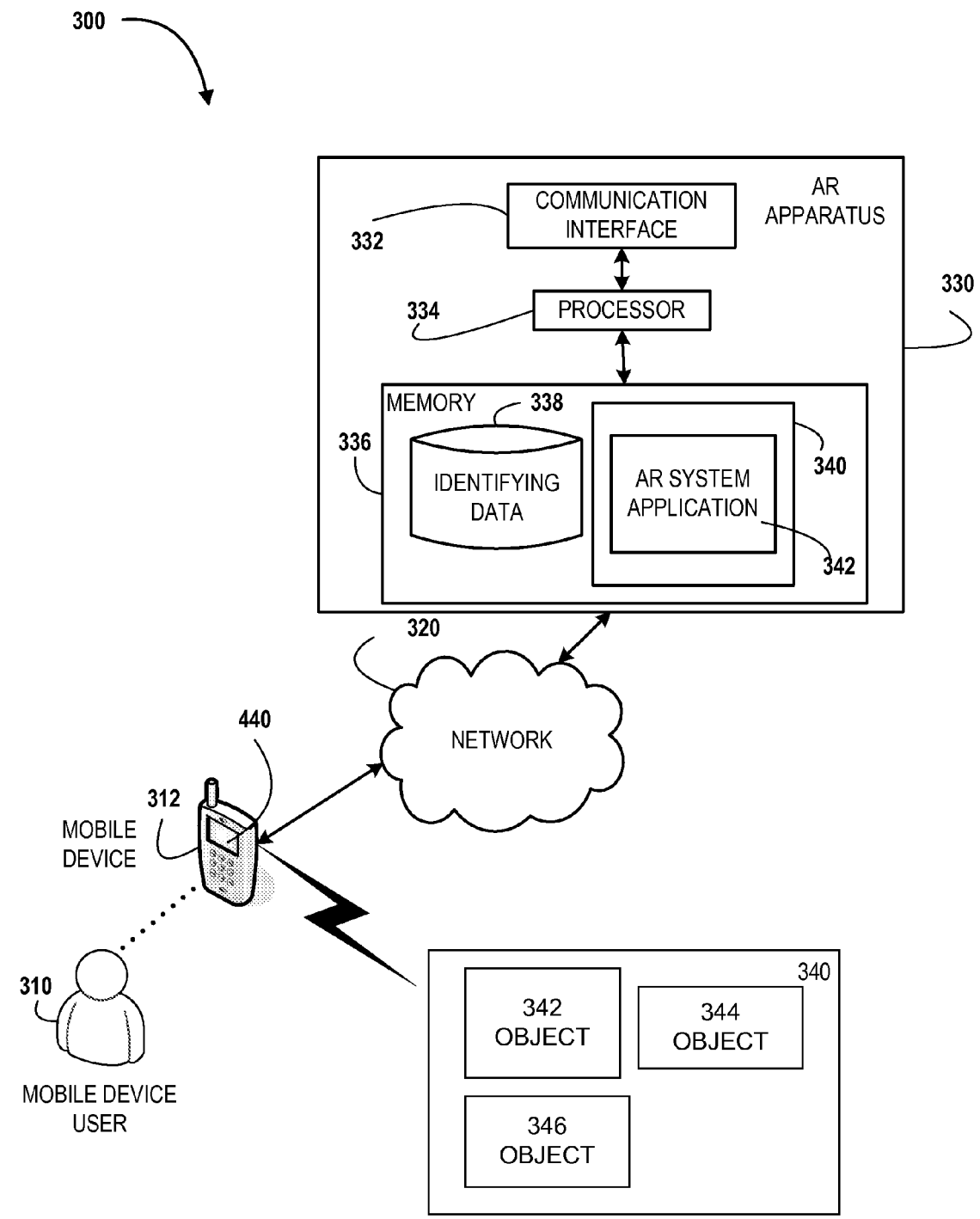

FIG. 3 is a block diagram illustrating technical components of a system for providing information regarding relationships between one or more individuals associated with a user of a mobile device and information associated with an image, in accordance with an embodiment of the present invention.

Figure 4:
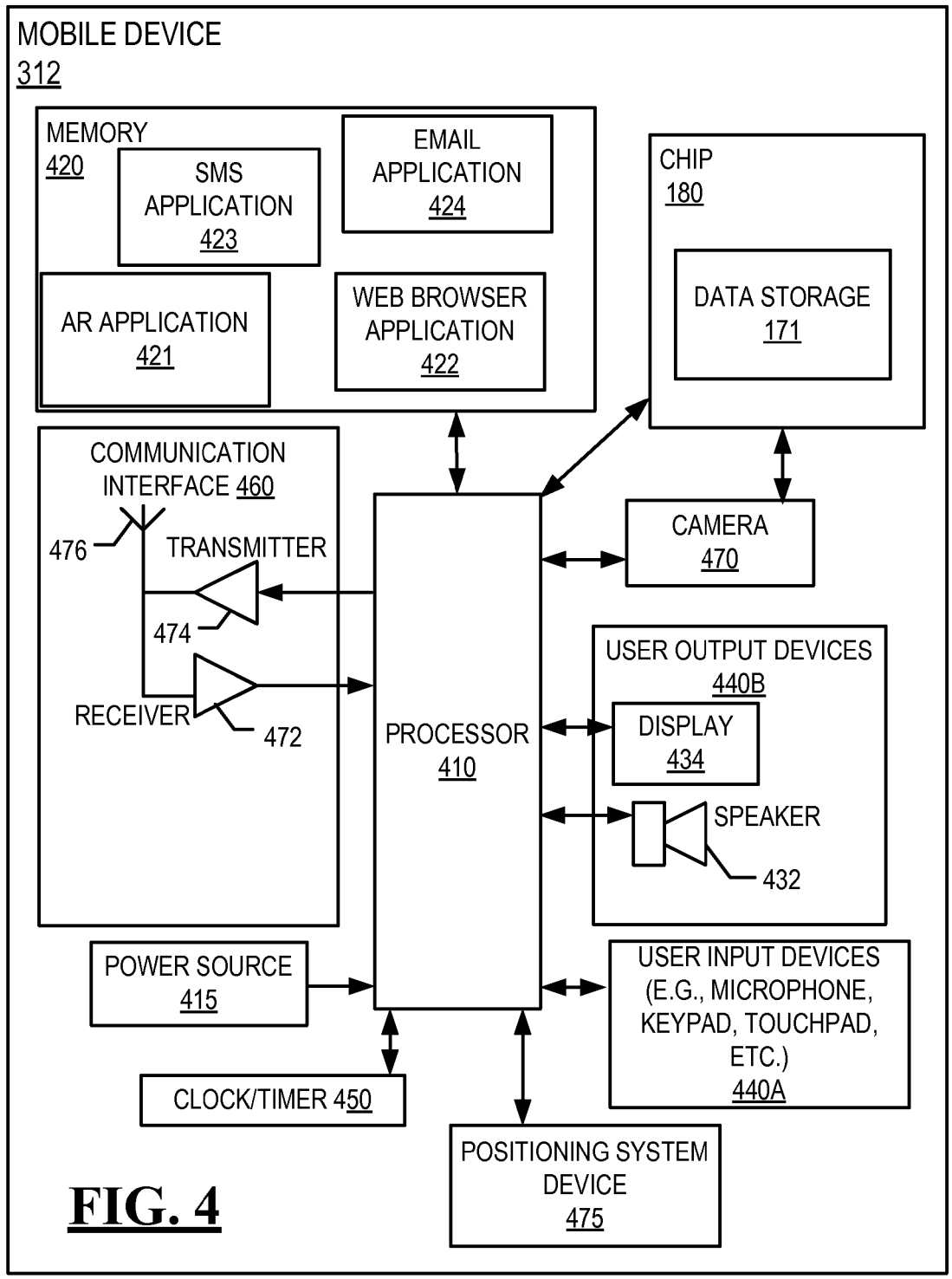

FIG. 4 is a block diagram illustrating technical components of a mobile device configured to provide information regarding relationships between one or more individuals associated with a user of a mobile device and information associated with an image, in accordance with an embodiment of the present invention; and FIGS. 5-8 are block diagrams illustrating a display of information regarding relationships between one or more individuals associated with a user of a mobile device and information associated with an image, in accordance embodiments of the present invention.

DETAILED DESCRIPTION OF EMBODIMENTS OF THE PRESENT INVENTION

Referring now to FIG. 1, a general process flow 100 is provided for providing relationship information between one or more individuals associated with a user and information associated with products, locations, businesses, etc., identified in a captured image. In some embodiments, this image is captured by a mobile device, while in other embodiments, the image may be obtained from any other source. In some embodiments, the process flow is related to an augmented reality environment. In some embodiments, the process flow 100 is performed by an apparatus (i.e., one or more apparatuses) having hardware and/or software configured to perform one or more portions of the process flow 100. In such embodiments, as represented by block 110, the apparatus is configured to receive information associated with an image. In some embodiments, the image is captured by a mobile device operated by a user. As represented in block 120, the apparatus is also configured to receive information regarding one or more individuals. In some embodiments, these one or more individuals are associated with the user. In addition, as represented in block 130, the apparatus is configured to determine, based at least partially on the received information, one or more relationships between information regarding individuals and information associated with the image. In addition, as represented in block 140, the apparatus is configured to present, via the mobile device of the user, information associated with the one or more relationships. An apparatus may be able to execute each of the four blocks of FIG. 1 dynamically in real-time. In some embodiments, "real-time" means instantly or immediately upon a user capturing the image or a user executing an AR function, while in other embodiments "real-time" may mean a short delay of a few seconds (e.g., thirty seconds) or a few minutes (e.g., two minutes).

The term "determine," in some embodiments, is meant to have one or more of its ordinary meanings (i.e., its ordinary dictionary definition(s)), but that in other embodiments, that term is meant to have one or more of the ordinary meanings of one or more of the following terms: decide, conclude, verify, ascertain, find, discover, learn, calculate, observe, read, and/or the like. Further, in some embodiments, the phrase "based at least partially on," in some embodiments, is meant to have one or more of its ordinary meanings, but in other embodiments, that phrase is meant to have one or more of the ordinary meanings of one or more of the following terms and/or phrases: as a result of, because of, after, if, when, in response to, and/or the like.

It will also be understood that the apparatus having the process flow 100 can include one or more separate and/or different apparatuses. For example, in some embodiments, one apparatus (e.g., the AR Apparatus 330 described in connection with FIG. 3, etc.) is configured to perform all of the portions of the process flow 100 represented by blocks 110-140. Alternatively, in other embodiments, a different apparatus (e.g., the mobile device 312 described in connection with FIG. 4, etc) is configured to perform all of the portions of process flow 100 represented by blocks 110-140. It will also be understood that, in some other embodiments, one or more AR apparatus (e.g., the AR Apparatus 330) and a mobile device (e.g., mobile device 312) are configured to perform one or more of the portions of the process flow 100.

Regarding block 110, the phrase "image," as used herein, typically refers to any type of digital image. For instance, in some embodiments, an image could be a still image captured by a digital camera. Alternatively, an image could be a digital image created by scanning a photograph or other type of picture. In some embodiments, an image could be a single frame from a continuous stream of images, where the continuous stream includes a real-time video stream captured by a digital video recorder. In yet another embodiment, an image could be a digital image created through the use of graphic design software or illustration software.

Further regarding block 110, the phrase "information associated with an image" could be any information associated with an image. In some embodiments, the image itself may be information associated with an image. In some embodiments, metadata, which could be decoded into the image or stored elsewhere, could be information associated with an image. In some embodiments, information associated with an image could be the results of any analysis of the image (e.g., image comparison analysis, pattern recognition analysis or image recognition analysis). In another embodiment of the invention, information associated with an image could by the output of any modeling or composite imaging processes that are based in part on the image. In yet another embodiment, information associated with an image could be information concerning the location of an object depicted in an image.

The mobile device referred to in block 110 may be any mobile communication device, such as a cellular telecommunications device (i.e., a cell phone or mobile phone), personal digital assistant (PDA), a mobile Internet accessing device, or other mobile device including, but not limited to portable digital assistants (PDAs), pagers, mobile televisions, gaming devices, laptop computers, cameras, video recorders, audio/video player, radio, GPS devices, any combination of the aforementioned, or the like.

Also, with regards to block 110, the phrase "captured" as used herein, refers to any method in which a mobile device may acquire, display and/or store an image. In some embodiments of the invention, the mobile device may capture an image by using digital camera functionality. In some embodiments of the invention, the mobile device may capture an image by using digital video recording functionality. In yet some other embodiments of the invention, the mobile device may capture an image by reading any type of storage medium, such as a flash memory card, that stores an image.

Lastly, in some embodiments, the apparatus having the process flow 100 may receive information associated with an image through any type of wireless and/or contactless communication network. In some embodiments, the apparatus may receive information associated with an image via a second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, future generation wireless communication protocols and/or the like. In some other embodiments, the apparatus having the process flow 100 may also be configured to receive information associated with an image in accordance with non-cellular communication mechanisms, such as via a wireless local area network (WLAN), global area network (GAN), a wide-area network (WAN), the Internet or other communication/data networks. In other embodiments, the apparatus having the process flow 100 may receive information associated with an image through wired communications.

Regarding block 110, after receiving the image, in some embodiments, the apparatus may also identify a product, business, location, etc. (hereinafter referred to as an "object") that is depicted in the image. The phrase "depicts an object" refers to an image that provides any type of representation of an object. For example, in some embodiments, an image may depict an object if the object is visible anywhere in the image. The object may be in the foreground of the image or the object may be in the background of the image. Furthermore, the entire object may be visible in the image or only a portion of the object may be visible in the image. In some embodiments, the image may depict an object even if the object is not visible in the image. For instance, the image may depict an object if some type of identifiable feature is visible in the image that indicates that the object is nearby. The received information associated with the image is compared to a database of identifying data in order to identify an "object" or a "positive object" that is present in the image. The identifying data is any type of data that would identify an object.

In some embodiments of the invention where the object is a product, the identifying data may include: the size, shape or color of a product's packaging; a product's logo; the bar code information associated with a product; the ratio of the size of one feature of a product or its packaging to another feature; a product's physical location; or the appearance of a product itself (as opposed to its packaging). In some embodiments, the identifying data may concern a very small feature of a product, such as the alpha-numeric characters that identify a product, whereas, in other embodiments, the indentifying data may concern an entire product or package, such as the unique shape, size, structure etc. In other embodiments where the object is a product, the portion of the object that may be visible in the image may include, without limitation, the product's logo, the product's bar code, the product's name, or any portion of the product's packaging.

For a business, the identifying data may be any type of data that would identify a business. In some embodiments, the identifying data may include: the logo of the business, the décor of the business, one or more trademarks associated with the business, etc. For a location, the identifying data is any type of data that would identify a location, e.g., a street sign, a famous landmark, a street number that is visible on a local business or a home, a positioning system device signal that is communicated from the mobile device (e.g., global positioning system (GPS) signal), etc.

The identifying data may be stored in one or memory devices of the one or more apparatuses that perform the steps of process flow 100. The identifying data may be added to a memory device by the user or a third party. In some embodiments, the user or third party may add the identifying data to a memory device and then associate the identifying data with at least the name of an object. In other embodiments, the identifying data may also be associated with any other type of additional information about an object. In some embodiments of the invention, the apparatus having the process flow 100 may store identifying data that relates to products, businesses, locations, etc.

In block 110, the apparatus having the process flow 100 may use any means to determine that the image depicts an object. In some embodiments, the apparatus may utilize one or more methods, such as pattern recognition algorithms, to analyze information associated with an image and compare such information with identifying data of objects (hereinafter referred to as "identifying data"). If the information associated with the image matches identifying data, either exactly or with a certain degree of confidence, then the apparatus determines that the image depicts an object.

In some embodiments, the apparatus may use pattern recognition algorithms such as decision trees, logistic regression, Bayes classifiers, support vector machines, kernel estimation, perceptrons, clustering algorithms, regression algorithms, categorical sequence labeling algorithms, real-valued sequence labeling algorithms, parsing algorithms, general algorithms for predicting arbitrarily-structured labels such as Bayesian networks and Markov random fields, ensemble learning algorithms such as bootstrap aggregating, boosting, ensemble averaging, combinations thereof, and the like to determine that the image depicts an object.

In other embodiments of block 110, the apparatus may utilize other metrics to determine that the image depicts an object. For instance, the apparatus may utilize the user's location, time of day, season, weather, speed of location changes (e.g., walking versus traveling), "busyness" (e.g., how many objects are in motion versus stationary in the video stream), as well as any number of other conceivable factors in determining whether the image depicts an object. Moreover, the user may input preferences or other metrics for which the apparatus may utilize to narrow results of identified projects.

In yet another embodiment of block 110, the information associated with the image may match one or more pieces of identifying data, such that the apparatus determines that the image depicts more than one object. In such instances, the user may be presented with multiple candidate identifications and may opt to choose the appropriate identification or input a different identification. The multiple candidates may be presented to the user by any means. For instance, in one embodiment, the candidates are presented to the user as a list wherein the "strongest" candidate is listed first based on reliability of the identification. Upon input by the user identifying the object, the apparatus may "learn" from the input and store additional identifying data in order to avoid multiple identification candidates for the same object in future identifications.

In some embodiments of block 120, the individuals may be "individuals associated with the user." Regarding block 120, the phrase "individuals associated with the user" generally means friends, family, neighbors, colleagues, acquaintances that are identified by an apparatus through one or more social networks associated with the user, electronic contact lists or electronic address books associated with the user, or other input provided by the user.

In some embodiments, the apparatus automatically receives data about these individuals from one or more social networks associated with the user. The apparatus may only be able to receive data associated with individuals that share data with their social network. For instance, an individual may share his or her location from where the individual accessed the social network. Therefore, the apparatus may receive information regarding one or more previous locations associated with an individual's access of the social network during a predetermined period of time (e.g., the previous six months). As another instance, an individual may share likes, dislikes, interests, favorites etc. on a social network. As another instance, an individual may share pictures, news articles, blog posts, etc. on a social network. As another instance, an individual may also share one or more messages that the individual sends to or receives from other individuals. As still another instance, an individual may use one or more applications on a social network, and an individual may choose to share information provided to these one or more applications or information generated from using one of these one or more applications. In some embodiments, an individual may share random thoughts such as what the individual is currently thinking, whether the individual likes or dislikes one or more pieces of information shared by other individuals on the social network, etc. In some embodiments, a social network may also include a blogging network or website (i.e., an address on a network) or a message posting network or website. Therefore, the apparatus may be able to receive data from such message posting networks. For instance, the apparatus may be able to receive a review posted on a blogging or micro-blogging website of a television recently purchased by an individual, where the individual has been identified as being associated with the user of the mobile device. As explained earlier, an apparatus performs this identification by analyzing data from one or more social networks associated with the user, contact lists associated with the user, or other input provided by the user.

In other embodiments, the apparatus automatically receives data from contact lists associated with the user's mobile device, or the user's email inbox, etc. In some embodiments, the apparatus may also have the capability to receive data regarding individuals from the user's emails, the user's text messages, the user's voicemails, etc. In some embodiments, the apparatus may also have the capability to receive data regarding individuals from electronic files stored on one or more computing systems or cloud computing systems associated with the user.

In some embodiments, the apparatus may receive information about individuals associated with the user from a financial institution that manages a database including transaction history (including purchases and returns) associated with one or more individuals. Therefore, a financial institution may have a system that automatically stores digital copies of receipts of transactions executed by one or more individuals. The financial institution may also have a system that has the ability to scan and analyze electronic banking transactions history. An individual may have a choice to opt-in or opt-out of sharing such transaction data with the financial institution.

In some embodiments, the apparatus may receive information about individuals associated with the user from a merchant (e.g., an electronics company) that manages a database including transaction history (including purchases and returns) associated with one or more individuals. Therefore, a merchant may have a system that automatically stores digital copies of receipts of transactions executed by one or more individual. An individual may have a choice to opt-in or opt-out of sharing such transaction data with the merchant.

In some embodiments, apparatus may receive data through an API. In this way, the data may be stored in a separate API and be implemented by request from the mobile device and/or server accesses another application by way of an API.

In some embodiments, the apparatus allows a user to input a person's name, regardless of whether that person is actually associated with the user (e.g., the user may input the name of an individual known to the user, or the user may input the name of a celebrity or someone completely unknown to the user, or the user may input the name of a person that the user knows but is not acquainted with, etc.). Therefore, at block 120, the apparatus gathers data regarding the identified individuals. In some embodiments, the apparatus may have to conduct a search on a network, such as the Internet, in order to find information associated with one or more individuals (e.g., names of celebrities input by the user). In other embodiments, the apparatus receives information regarding individuals from one or more social or messaging networks and/or from any other publicly available sources of information.

Regarding block 130, the apparatus having the process flow 100 may use any means to determine that an individual determined at block 120 is related to an object identified at block 110. As used herein, the phrase "related to" may mean that an individual has engaged in a transaction associated with the object (e.g., purchase or return of a product), has written something about the object (e.g., blog post or message on a social network about a product, business, location, etc.), has previously visited the object (e.g., a location or a business), or the like. The phrase "related to" should be afforded the broadest interpretation possible and may capture other embodiments not described herein. In some embodiments, the apparatus may utilize one or more methods, such as pattern recognition algorithms, to analyze first information associated with an image, analyze second information associated with one or more individuals, and compare the first information with the second information. If the first information associated with the image matches second information associated with one or more individuals, either exactly or with a certain degree of confidence, then the apparatus determines that a relationship exists between an object and an individual.

In some embodiments, the apparatus may use comparison or pattern recognition algorithms such as decision trees, logistic regression, Bayes classifiers, support vector machines, kernel estimation, perceptrons, clustering algorithms, regression algorithms, categorical sequence labeling algorithms, real-valued sequence labeling algorithms, parsing algorithms, general algorithms for predicting arbitrarily-structured labels such as Bayesian networks and Markov random fields, ensemble learning algorithms such as bootstrap aggregating, boosting, ensemble averaging, combinations thereof, and the like to determine that an individual determined at block 120 is related to an object identified at block 110. In some embodiments, the user may input preferences or other metrics for which the apparatus may utilize to narrow results of identified relationships between individuals determined at block 120 and objects identified at block 110.

In some embodiments of block 130, the first information associated with the image may match more than one individual. In instances where the first information associated with the image matches more than one individual, the user may be presented with multiple candidate identifications (i.e., individuals) and may opt to choose the appropriate identification or input a different identification. The multiple candidates may be presented to the user by any means. For instance, in one embodiment, the candidates are presented to the user as a list wherein the "strongest" candidate (i.e., the individual that most relates to an object identified from the first information) is listed first based on reliability of the identification. Upon input by the user identifying the individual, the apparatus may "learn" from the input and store additional data in order to avoid multiple identification candidates (i.e., individuals) for the same object in future identifications or present the multiple identification candidates in an order that suits the user's interests (e.g., the user is more interested in knowing about relationship data associated with family rather than friends).

In some embodiments of block 130, the first information associated with the image may relate to a single individual in more than one way (i.e., more than one relationship with a single individual). For instance, the object is an "ABC" brand High Definition (HD) television, and an individual has blogged about the ABC HD television on a micro-blogging website (a "messaging relationship") and also recently purchased the ABC HD television ("a transaction relationship"). In instances where an object of the first information associated with the image relates to an individual in more than one manner, the user may be presented with multiple candidate identifications (i.e., multiple relationships) and may opt to choose the appropriate identification or input a different identification (e.g., the user may opt to choose "transaction" relationship data rather than "messaging" relationship data). The multiple candidates may be presented to the user by any means. For instance, in one embodiment, the candidates are presented to the user as a list wherein the "strongest" candidate is listed first based on reliability of the identification (e.g., the transaction relationship may be presented before the messaging relationship). Upon input by the user identifying the relationship, the apparatus may "learn" from the input and store additional data in order to avoid multiple identification candidates (i.e., relationships) for the same object in future identifications, or present the multiple identification candidates in an order that suits the user's interests (e.g., list transaction relationships higher on the list and messaging relationships lower on the list).

Regarding block 140, in some embodiments, when the apparatus determines a relationship exists between an object and an individual, the apparatus may present to the user information regarding this relationship. In alternate embodiments, the apparatus may present an indicator associated with the relationship on the mobile device display to indicate that there is a relationship between an object and an individual. The phrase "indicator associated with the relationship" generally means an indicator, such as a tab, link, graphic or image, that is presented on the display of a mobile device and that is associated with the a relationship that has been determined between an object identified at block 110 and an individual identified at block 120. The indicator may be any color and may be in any shape. In embodiments where all or part of the indicator is a line, the line may be solid, dashed, dotted or any combination thereof. In some embodiments of the invention, the indicator indicates that that object to which the indicator is associated is related to an individual.

An indicator as described herein may be identified by an object recognition application or an AR application. An indicator may be any type of indicator that is a distinguishing feature that can be interpreted by the object recognition application or the AR application to identify objects or relationships. For instance, an indicator may be alpha-numeric characters, symbols, logos, shapes, ratio of size of one feature to another feature, a product identifying code such as a bar code, electromagnetic radiation such as radio waves (e.g., radio frequency identification (RFID)), architectural features, color, etc. In some embodiments, the indicator may be audio and the mobile device may be capable of utilizing audio recognition to identify words or unique sounds broadcast. The indicator may be any size, shape, etc. Indeed, in some embodiments, the indicator may be very small relative to the object such as the alpha-numeric characters that identify the name or model of an object, whereas, in other embodiments, the indicator is the entire object such as the unique shape, size, structure, etc.

In some embodiments, the indicator is "selectable" and a user may "select" the indicator and retrieve information related to the object or the individual related to the object, including how the individual is related to the object. The information may include any desired information concerning the object or the individual and may range from basic information to greatly detailed information. Alternatively, all or a portion of the indicator may include a hyperlink.

In embodiments in which the indicator provides an interactive tab, link, graphic or image to the user, the user may select the indicator by any conventional means for interaction with the mobile device. For instance, in some embodiments, the user may utilize an input device, such as a keyboard to highlight and select the indicator in order to retrieve the information. In some embodiments, the user may be able to select the indicator by the touch screen display of a mobile device.

In some embodiments, the indicator is not interactive and simply provides information to the user by displaying information on the display of a mobile device. For example, in some embodiments, the indicator may merely identify an object, just identify the object's name/title, or present brief information about the object, etc., rather than provide extensive detail that requires interaction with the indicator. In other embodiments, the indicator may also identify the individual related to the object (e.g., via a thumbnail picture of the individual related to the object), and/or present brief information regarding the individual (e.g., name of individual and brief details on how the individual is associated with the user), and/or present brief information regarding how the individual is related to the object.

Furthermore, the indicator may be displayed at any side on the mobile device display. The indicator may be small enough that it is positioned on, next to or around an image of an object. In some embodiments, the image of the object may remain discernable next to the indicator. In some embodiments, the indicator may be semi-transparent such that the image of the object remains discernable behind the indicator. In some embodiments, the image of the object may be discernable because the indicator forms an outline of the object. In yet some other embodiments, the indicator may be large enough to completely cover the object depicted on the mobile device display. Indeed, in some embodiments, the indicator may cover a majority or the entirety of the mobile device display.

Further regarding block 140, the phrase "present, via the mobile device operated by the user" generally means displaying on the display of the mobile device. In some embodiments, the apparatus having the process flow 100 may present the indicator by superimposing the indicator over a real-time video stream that is captured by the mobile device. This real-time video stream may depict the object. In some embodiments of the invention, the indicator may only be superimposed over real-time video if the real-time video stream still depicts the object. Thus, in some embodiments, the mobile device 312 determines if it is still capturing a real-time video stream that depicts the object. In other embodiments, AR Apparatus 330 determines if the mobile device 312 is still capturing a real-time video stream that depicts the object.

In some embodiments of the invention, "presenting" may include transmitting a still image of the object to the mobile device, where the still image includes the indicator. The still image may be transmitted to the mobile device via email, Multi Media Service (MMS) messaging, picture messages or any other methods known to those skilled in the art.

Referring now to FIG. 2, a more-detailed process flow 200 for providing information regarding relationships between one or more individuals associated with a user of a mobile device and information associated with an image. In some embodiments, the information associated with an image includes one or more objects (e.g., products, locations, businesses, etc.) depicted in the image. In some embodiments, this image is captured by a mobile device, while in other embodiments, the image may be obtained from any other source. In some embodiments, the process flow is related to an augmented reality environment. In the example embodiment of FIG. 2, the object is a product. In other embodiments of FIG. 2 (not presented here), the object may be a location, a business, etc. In some embodiments, one or more portions of the process flow 200 are performed by an apparatus having hardware and/or software configured to perform one or more portions of the process flow 200. In some of these embodiments, the apparatus configured to perform the process flow 100 is also configured to perform the process flow 200. As such, it will be understood that the process flow 200 illustrated in FIG. 2 represents an example embodiment of the process flow 100 described in connection with FIG. 1.

It will also be understood that the apparatus having the process flow 200 can include one or more separate and/or different apparatuses. For example, in some embodiments, one apparatus (e.g., the AR Apparatus 330 described in connection with FIG. 3, etc.) is configured to perform the all of the portions of the process flow 200 represented by blocks 205-260. Alternatively, in other embodiments, a different apparatus (e.g., the mobile device 312 described in connection with FIG. 4, etc) is configured to perform all of the portions of process flow 200 represented by blocks 205-260. It will also be understood that, in some other embodiments, one or more AR apparatus (e.g., the AR Apparatus 330) and mobile device (e.g., mobile device 312) are configured to perform one or more of the portions of the process flow 200.

One or more apparatuses may be able to execute each of the blocks of FIG. 2 dynamically in real-time. In some embodiments, "real-time" means instantly or immediately upon a user capturing the image or a user executing an AR function, while in other embodiments "real-time" may mean a short delay of a few seconds (e.g., thirty seconds) or a few minutes (e.g., two minutes).

In some embodiments, as represented by block 205, a user enters a department store and approaches a product that is located at the store. The store may be a grocery store, department store, convenience store or any other location where products are located. In some embodiments of the invention, the user may approach a shelf where a product is located. In other embodiments of the invention, the user may stand at a counter, where the product is located behind the counter. As one of ordinary skill in the art will appreciate, it does not matter whether the store is offering the product for sale or if the user is required to use some alternative method to acquire the product. In other embodiments where the user intends to capture an image of a location or a business, rather than a product, the user does not enter a store and may be situated anywhere. For instance, a user may be situated in a mall, on a street, in an airplane, on a ship, in a sports stadium, in a classroom, at a restaurant, etc.

After approaching the product, at block 210, the user points a mobile device at the product. In this process flow, the user points the mobile device at the product such that the product is within the field of view of the mobile device's digital video recorder functionality. However, in other embodiments of the invention, the user may point the mobile device at the product such that the product is within the field of view of the mobile device's digital camera functionality.

In some embodiments, the user may not try to capture an image of a product; instead, the user may try to capture an image of a business or a location. Therefore, in other embodiments where the user does not enter the store, the user may point the mobile device at the store from a longer range (e.g., point the mobile device at the store's name or logo at the front of the store). In still other embodiments, the user may point the mobile device at a store along a street (e.g., at Joe's Pizza Corner). In still other embodiments, the user may point the mobile device at advertising hoardings on the street, in a sports stadium, etc. In still other embodiments, the user may randomly point the mobile device at a location, such as a street corner or the like, without tying to capture any particular location, business or product.

At block 215, the mobile device user captures an image of the product as part of a real-time video stream. In some embodiments, the real-time video stream is captured via the mobile device's digital video recorder functionality. As previously discussed, the image may be a single frame of the real-time video stream. In some embodiments, the user may opt to execute an AR application, which is configured to run on the mobile device, and begin video capture. However, in some other embodiments, the AR application includes an "always on" feature in which the mobile device is continuously capturing video In such embodiments, the AR application may be configured to alert the user that a user-selected object has been identified to be related to an individual associated with the user, e.g., the user inputs an instruction that the user should be alerted when the AR apparatus identifies relationship data for, example, "ABC" brand television, i.e., when the AR apparatus determines an individual that is "related to" (e.g., purchased, returned, blogged about, wrote a review for, etc.) "ABC" television. In other embodiments, the AR application may be configured to alert the user that a user-selected product has been identified to be related to a user-selected individual, e.g., the user inputs an instruction that the user should be alerted when the AR apparatus identifies relationship data associated with the user's brother for "ABC" television, i.e., when the AR apparatus determines that the user's brother is "related to" (e.g., purchased, returned, blogged about, wrote a review for, etc.) "ABC" television. In still other embodiments, the AR application may be configured to alert the user when the AR apparatus identifies an object (e.g., product, location, business) to be related to a user-selected individual (e.g., the user's brother), e.g., the user inputs an instruction that the user should be alerted when the AR apparatus identifies relationship data associated with the user's brother, i.e., when the AR apparatus determines that the user's brother is "related to" an object (e.g., product, location, business, etc.) identified in an image.

The user may set any number of user preferences to tailor the AR experience to their needs. For instance, the user may opt to only be alerted if a certain product is identified or if a certain individual or group of individuals (i.e., family members) have a relationship with a product. Additionally, it will be appreciated that the "always on" feature in which video is continuously captured may consume the mobile device power source more quickly. Thus, in some embodiments, the "always on" feature may disengage if a determined event occurs such as low power source, low levels of light for an extended period of time (e.g., such as if the mobile device is in a user's pocket obstructing a clear view of the environment from the mobile device), if the mobile device remains stationary (thus receiving the same video stream) for an extended period of time, the user sets a certain time of day to disengage, etc. Conversely, if the "always on" feature is disengaged due to the occurrence of such an event, the user may opt for the "always on" feature to re-engage after the duration of the disengaging event (e.g., power source is re-charged, light levels are increased, etc.).

At block 220, the apparatus having the process flow 200 receives information (also referred to as "first information") associated with the image captured at block 215. In some embodiments of the invention, where the information associated with the image is the image itself, the apparatus receives an image which corresponds to a frame from the real-time video stream. In some embodiments, the apparatus may receive image metadata. In yet another embodiment, the information associated with the image could be information concerning the location of the product depicted in the image. In some embodiments, the apparatus may receive the information via a cellular network, such as a wireless communication protocol, and in other embodiments, the apparatus may receive the information via a non-cellular network, such as a WLAN, WAN, GAN or the Internet. In some embodiments, the apparatus receives information regarding products, locations, or businesses identified by the apparatus.

In some embodiments, at block 220, the apparatus, after receiving information associated with the image, also identifies one or more objects in the image. For a product, the identifying data is any type of data that would identify a product. In some embodiments of the invention, the identifying data may include: the size, shape or color of a product's packaging; a product's logo; the bar code information associated with a product; the ratio of the size of one feature of a product or its packaging to another feature; a product's physical location; or the appearance of a product itself (as opposed to its packaging). In some embodiments, the identifying data may concern a very small feature of a product, such as the alpha-numeric characters that identify a product, whereas, in other embodiments, the indentifying data may concern an entire product or package, such as the unique shape, size, structure etc.

For a business, the identifying data may be any type of data that would identify a business. In some embodiments, the identifying data may include: the logo of the business, the décor of the business, one or more trademarks associated with the business, etc. For a location, the identifying data may be any type of data that would identify a location, e.g.,
a street sign, a famous landmark, a street number that is visible on a local business or a home, etc.

At block 223, the system receives information (also referred to as "second information") associated with one or more individuals. The various embodiments associated with receiving this information have been explained with respect to block 120 in FIG. 1.

At block 225, the apparatus then compares the first information associated with the image to second information associated with individuals to determine if there is a relationship between the product in the image and the individuals. The various embodiments associated with this block have been previously explained with respect to block 130 in FIG. 1.

At block 230, the apparatus determines whether the image depicts a product that is related to an individual. In some embodiments, the apparatus will only determine that the image is related to an individual (and present a relationship indicator in some embodiments) if there is a 100% match between the information associated with the image and information associated with the individual. In some embodiments, the apparatus will determine that the image is related to the individual (and present a relationship indicator) if the correlation between the information associated with the image and the information associated with the individual exceeds a confidence threshold. In any event, if the apparatus determines that the images does not depict a product related to the individual, then the apparatus does not present an indicator via the mobile device operated by the user, as shown in block 235. However, if the apparatus does determine that the image depicts a product related to the individual, then the process flow proceeds to block 240.

At block 240, the apparatus having the process flow 200 determines whether the mobile device of the user is still capturing a real-time video stream of the product. In some embodiments of the invention where mobile device 312 performs all or part of the steps of process flow 200, block 240 may be performed by mobile device 312. In other embodiments of the invention where AR Apparatus 330 performs all or part of the steps of process flow 200, block 240 may be performed by AR Apparatus 330. In some embodiments, AR Apparatus 330 may determine that mobile device 312 is still capturing a real-time video stream of the product by receiving information associated with the images that include the real-time video stream being currently captured by mobile device 312. In other embodiments, mobile device 312 may transmit information to AR Apparatus 330 indicating that the mobile device 312 is still capturing a real-time video stream of the product.

If the mobile device is not still capturing a real-time video stream of the product, then the apparatus having the process flow 200 does not present an indicator via the mobile device, as shown in block 245. However, if the mobile device is still capturing a real-time video stream that depicts the product, then the apparatus presents, via the mobile device of the user, an indicator associated with the product, as indicated at block 250.

As one of ordinary skill in the art will appreciate, if AR Apparatus 330 determines that mobile device 312 is not currently capturing a real-time video stream of the product at one point in time, but later determines that that mobile device 312 is capturing a real-time video stream of the product, then AR Apparatus 330 may still present, via mobile device 312, an indicator associated with the product. At such point, the process flow would continue to block 250.

At block 250, the apparatus presents, via the mobile device operated by the user, a relationship indicator associated with the product. Generally, the indicator is displayed on the mobile device display. As illustrated in block 250, the indicator is superimposed over the real-time video stream that is captured by the mobile device. A user may look at the display of the mobile device and determine that a product is associated with an individual because the depiction of the product on the mobile device display is associated with an indicator. The indicator may be any color and it may be in any shape. In some embodiments of the invention, the indicator appears as a solid line that surrounds the depiction of the product on mobile device display. In other embodiments, the indicator may be semi-transparent and appear on top of the depiction of the product on the mobile device display. In some embodiments, the apparatus displays close to the indicator, the name of the individual related to the product or a thumbnail picture of the individual related to the product, or the like. In other embodiments, the apparatus displays as the indicator, a name of the individual related to the product or a thumbnail picture of the individual related to the product, or the like.

In some embodiments, the mobile device and/or the server access one or more databases or datastores (not shown) to search for and/or retrieve information related to the object and/or marker. In some embodiments, the mobile device and/or the server access one or more datastores local to the mobile device and/or server and in other embodiments, the mobile device and/or server access datastores remote to the mobile device and/or server. In some embodiments, the mobile device and/or server access both a memory and/or datastore local to the mobile device and/or server as well as a datastore remote from the mobile device and/or server In the embodiment of the invention described at block 250, the indicator is selectable. Thus, in such embodiments, the user may "select" the indicator and retrieve information regarding how the individual is related to the product (e.g., the apparatus may display that the individual lists the product as a "favorite" product on the individual's social network homepage). This is shown in block 255.

At block 255, the user selects the indicator to obtain information about the relationship between the individual and the product. In some embodiments of the invention, selecting the indicator may provide information about how the individual is related to the product, e.g., the individual recently purchased the product, the individual recently posted a message (could be positive or negative) about the product on a social network, the individual listed the product as "like" or "dislike" on a social network, the individual posted a link regarding a news article about the product or the company that manufactures the product, the individual recently bought a product that competes with the product in the image, the individual engages in a hobby that uses the product, etc. Selecting the indicator also provides any type of additional information about the product (e.g., details about the product, how many people on the user's social network bought the product recently, etc.) or the individual (name of the individual, age of the individual, where the individual is located, how the individual is associated with the user, etc.). In some embodiments, the indicator may provide an Internet hyperlink to enable the user to obtain further information about the product or enable the user to purchase the product by directing the user to a website where product is offered for sale. In some embodiments, the indicator may provide an Internet hyperlink to enable the user to obtain further information about the individual related to the product, or how the individual is related to the product. In some embodiments, the indicator itself may be a hyperlink, or in other embodiments, selecting the indicator will present the user with a hyperlink.

At block 260, the user may purchase the product and then leaves the store. In some embodiments of the invention, the user may purchase the product at the store by physically bringing the product to a cash register or through the use of other in-store check-out means. In some embodiments of the invention, the user may purchase the product through an online banking application or virtual wallet application that is accessed through the mobile device. In other embodiments of the invention, the user selects the indicator associated with the product to access a hyperlink that enables the user to purchase the product from a website. In some embodiments, the user then may purchase the product from the website of the store where the user is currently located, pay for the product online, and then take the product from the store. In other embodiments, the user may purchase the product online from another retailer and then that retailer will ship or deliver the product to the user. In such embodiments, where the product is shipped or delivered to the user, the user will leave the store without possessing the product.

Referring now to FIG. 3, a system 300 is illustrated for providing information regarding relationships between one or more individuals associated with a user of a mobile device and information associated with an image. In some embodiments, the information associated with an image includes one or more objects (e.g., products, locations, businesses, etc.) depicted in the image. As illustrated, system 300 includes network 320, and AR Apparatus 330, and a mobile device 312. In some embodiments, any and all functionality of the AR apparatus 330 may be incorporated into the mobile device 312. Therefore, in some embodiments, the mobile device 312 may be able to perform any process that can be performed by the AR apparatus 330. FIG. 3 also shows a mobile device user 310 (mobile device user 310 is also referred to herein as user 310) and mobile device field of view 340.

AR Apparatus 330 may generally include a processor 334 communicably coupled to such devices as a memory 336 and communication interface 332. The processor 334, and other processors described herein, may generally include circuitry for implementing communication and/or logic functions of the AR apparatus 334. For example, the processor 334 may include a digital signal processor device, a microprocessor device, and various analog to digital converters, digital to analog converters, and/or other support circuits. Control and signal processing functions of the AR Apparatus 330 may be allocated between these devices according to their respective capabilities. The processor 334 thus may also include the functionality to encode and interleave messages and data prior to modulation and transmission. The processor 334 may additionally include an internal data modem. Further, the processor 334 may include functionality to operate one or more software programs or applications, which may be stored as computer-readable code 340 in the memory 336.

The processor 334 may be configured to use the communication interface 332 to communicate with one or more other devices on a network. The processor 334 may be configured to provide signals to and receive signals from the communication interface 332. In some embodiments, the signals may include signaling information in accordance with the air interface standard of the applicable cellular system of the wireless telephone network that may be part of the network. In this regard, the AR Apparatus 330 may be configured to operate with one or more air interface standards, communication protocols, modulation types, and access types. By way of illustration, the AR Apparatus 330 may be configured to operate in accordance with any of a number of first, second, third, and/or fourth-generation communication protocols and/or the like. For example, AR Apparatus 330 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, and/or the like. AR Apparatus 330 may also be configured to operate in accordance with non-cellular communication mechanisms, such as via a wireless local area network (WLAN), global area network (GAN), a wide-area network (WAN), the Internet or other communication/data networks.

The processor 334 may also be capable of operating applications, such as an object recognition application. The object recognition application may be downloaded from a server and stored in the memory 420 of the mobile device 312. Alternatively, the object recognition application may be pre-installed and stored in a memory in the integrated circuit. In such an embodiment, the user may not need to download the object recognition application from a server. In some embodiments, the processor 334 may also be capable of operating one or more applications, such as one or more applications functioning as an artificial intelligence ("AI") engine. The processor 334 may recognize objects that it has identified in prior uses by way of the AI engine. In this way, the processor 334 may recognize specific objects and/or classes of objects, and store information related to the recognized objects in one or more memories and/or databases discussed herein. Once the AI engine has thereby "learned" of an object and/or class of objects, the AI engine may run concurrently with and/or collaborate with other modules or applications described herein to perform the various steps of the methods discussed. For example, in some embodiments, the AI engine recognizes an object that has been recognized before and stored by the AI engine. The AI engine may then communicate to another application or module of the mobile device and/or server, an indication that the object may be the same object previously recognized. In this regard, the AI engine may provide a baseline or starting point from which to determine the nature of the object. In other embodiments, the AI engine's recognition of an object is accepted as the final recognition of the object.

As further illustrated in FIG. 3, AR Apparatus 330 includes computer-readable instructions 337 stored in the memory device 336, which include the computer-readable instructions 337 of an AR System Application 339. The AR System Application 339 includes computer code that, when executed by the processor 334, performs the AR functions described herein. The memory 336 of the AR Apparatus 330 also includes data stored therein, such as identifying data 338. AR Apparatus 330 may be maintained by a financial institution, bank, third-party service provider or any other entity that wishes to provide the functionality described herein.

As indicated in FIG. 3, network 320 may include one or more telephone networks (e.g., cellular networks, CDMA networks, any wireline and/or wireless network over which communications to telephones and/or mobile phones are sent, etc.), local area networks (LANs), wide area networks (WANs), global area networks (GANs) (e.g., the Internet, etc.), and/or one or more other telecommunications networks. For example, in some embodiments, the network 320 includes a telephone network (e.g., for communicating with the mobile device 312, etc.). It will also be understood that the network 320 may be secure and/or unsecure and may also include wireless and/or wireline technology.

Mobile device field of view 340 includes the field of view of mobile device 312. In some embodiments, mobile device field of view 340 may be the field of view of the mobile device's digital camera functionality and in other embodiments, mobile device field of view 340 may be the field of view of the mobile device's digital video recorder functionality. In this embodiment, Object 342, Object 344 and Object 346 are located in mobile device field of view 340. As explained earlier, an object may be a product, business, location, etc. In some embodiments, mobile device user 310 uses mobile device 312 and AR Apparatus 330 to determine if objects 342-346 are related to one or more identified individuals. However, in other embodiments, objects 342-346 may be any object (e.g., product, location, business, etc.) that exists within mobile device field of view 340. Mobile device field of view 340 is not limited to this embodiment including objects 342-346. Mobile device field of view 340 may include an infinite number of objects, where each object may take on an infinite number of forms.

In various embodiments, information associated with or related to one or more objects that is retrieved for presentation to a user via the mobile device may be permanently or semi-permanently associated with the object. In other words, the object may be "tagged" with the information. In some embodiments, a location pointer is associated with an object after information is retrieved regarding the object. In this regard, subsequent mobile devices capturing the object for recognition may retrieve the associated information, tags and/or pointers in order to more quickly retrieve information regarding the object. In some embodiments, the mobile device provides the user an opportunity to post messages, links to information or the like and associate such postings with the object. Subsequent users may then be presenting such postings when their mobile devices capture and recognize an object. In some embodiments, the information gathered through the recognition and information retrieval process may be posted by the user in association with the object. Such tags and/or postings may be stored in a predetermined memory and/or database for ease of searching and retrieval.

Referring now to FIG. 4, a mobile device 312 is illustrated for providing information regarding relationships between one or more individuals associated with a user of a mobile device and information associated with an image. The mobile device may be configured to execute both object recognition and AR functionality. The embodiment present in FIG. 4 is merely an example embodiment. Other embodiments of the mobile device 312 may include other components that are not discussed here. In some embodiments, the mobile device 312 may be configured to provide or participate in AR functionality. Mobile device 312 may be any mobile communication device, such as a cellular telecommunications device (i.e., a cell phone or mobile phone), personal digital assistant (PDA), a mobile Internet accessing device, or other mobile device including, but not limited to portable digital assistants (PDAs), pagers, mobile televisions, gaming devices, laptop computers, cameras, video recorders, audio/video player, radio, GPS devices, any combination of the aforementioned, or the like.

The mobile device 312 may generally include a processor 410 communicably coupled to such devices as a memory 420, user output devices 440B, user input devices 440A, a network interface 460, a power source 415, a clock or other timer 450, a camera 470, and positioning system device 475. In some embodiments, camera 470 may be a digital camera configured to capture still images. In other embodiments, camera 470 may be a digital video recorder. In other embodiments, camera 470 may embody both digital camera functionality and digital video functionality. The processor 410, and other processors described herein, may generally include circuitry for implementing communication and/or logic functions of the mobile device 312. For example, the processor 410 may include a digital signal processor device, a microprocessor device, and various analog to digital converters, digital to analog converters, and/or other support circuits. Control and signal processing functions of the mobile device 312 may be allocated between these devices according to their respective capabilities. The processor 410 thus may also include the functionality to encode and interleave messages and data prior to modulation and transmission. The processor 410 may additionally include an internal data modem. Further, the processor 410 may include functionality to operate one or more software programs or applications, which may be stored in the memory 420. For example, the processor 410 may be capable of operating a connectivity program, such as a web browser application 422. The web browser application 422 may then allow the mobile device 312 to transmit and receive web content, such as, for example, location-based content and/or other web page content, according to a Wireless Application Protocol (WAP), Hypertext Transfer Protocol (HTTP), and/or the like.

In some embodiments, one or more components of the mobile device 312 may be performed by stand-alone devices that together comprise a system. For instance, the system includes a first separate stand-alone device that may include a camera 470, a second separate stand-alone device that may include user output devices 440B (including a display 434), a third separate stand-alone device that may include user input devices 440A, a fourth separate stand-alone device that may include a communication interface 460, a fifth separate stand-alone device that may include one or more of the other remaining components of the mobile device 312 (e.g., the processor 410, the memory 420, the power source 415, the chip 180, etc.). Each of these separate stand-alone devices may be temporarily or permanently affixed to different parts of a moving vehicle. For instance, a stand-alone device that includes the camera 470 may be positioned (e.g., facing the outside of the vehicle) such that the camera 470 captures images outside the vehicle. In some embodiments, the camera 470 is an omnidirectional camera that may have the ability to capture a 360 degree field of view in a horizontal plane or a field of view that covers almost an entire sphere. In some embodiments, a stand-alone device that includes the display 434 (or other output devices 440B) may be situated in an interior portion of the vehicle, such that a user of the system situated in the interior portion of the moving vehicle can view one or more images that are captured by the camera 470. In some embodiments, a stand-alone device that includes the input devices 440A may be situated in the interior portion of the vehicle such that a user of the system can enter input to the system (e.g, enter input that directs the camera 470 to capture an image). In some embodiments, a stand-alone device that includes the processor 410 and the memory 420 may be located in the interior portion of the vehicle. In some embodiments, one or more stand-alone devices of the system may be located at a remote location away from the vehicle. For instance, a stand-alone device that includes the processor 410 and the memory 420 may be located at a remote location. As a further instance, a stand-alone device that performs AR functionality may be located at a remote location. As an even further instance, a stand-alone device that includes the display 434 (or other output devices 440B) may be situated at a remote location such that a user of the system can view, at the remote location, one or more images that are captured by the camera 470. As an even further instance, a stand-alone device that includes the input devices 440A may be situated at a remote location such that a user of the system can enter, at the remote location, input to the system (e.g, enter input that directs the camera 470 to capture an image).

The processor 410 may also be capable of operating applications, such as an AR application 421. The AR application 421 may be downloaded from a server and stored in the memory 420 of the mobile device 312. In other embodiments, AR application 421 may be pre-installed on memory 420. AR application may include computer-readable code that when executed by processor 410 may provide the AR functionality described herein with regards to mobile device 312. In some embodiments, the processor 410 may also be capable of operating one or more applications, such as one or more applications functioning as an artificial intelligence ("AI") engine. The processor 410 may recognize objects that it has identified in prior uses by way of the AI engine. In this way, the processor 410 may recognize specific objects and/or classes of objects, and store information related to the recognized objects in one or more memories and/or databases discussed herein. Once the AI engine has thereby "learned" of an object and/or class of objects, the AI engine may run concurrently with and/or collaborate with other modules or applications described herein to perform the various steps of the methods discussed. For example, in some embodiments, the AI engine recognizes an object that has been recognized before and stored by the AI engine. The AI engine may then communicate to another application or module of the mobile device and/or server, an indication that the object may be the same object previously recognized. In this regard, the AI engine may provide a baseline or starting point from which to determine the nature of the object. In other embodiments, the AI engine's recognition of an object is accepted as the final recognition of the object.

In some embodiments, the mobile device may have a separate chip 180 that is in communication with the processor 410 and the camera 470. In some embodiments, the chip 180 may be able to store the AR application 421. In some embodiments, the chip 180 may also include a data storage 171. The data storage 171 may store information associated with an image captured by the camera 470. In some embodiments, the chip 180 may communicate with the AR apparatus 330 of FIG. 3.

The chip 180 (or integrated circuit) may include the necessary circuitry to provide the object recognition functionality to the mobile device 312. Generally, the chip 180 will include data storage 171 which may include data associated with the objects within a video stream that the object recognition application identifies as having a certain indicator(s). The chip 180 and/or data storage 171 may be an integrated circuit, a microprocessor, a system-on-a-integrated circuit, a microcontroller, or the like. As discussed above, in one embodiment, the chip 180 may provide the functionality to the mobile device 312.

Of note, while FIG. 4 illustrates the chip 180 as a separate and distinct element within the mobile device 312, it will be apparent to those skilled in the art that the object recognition functionality of chip 180 may be incorporated within other elements in the mobile device 312. For instance, the functionality of the chip 180 may be incorporated within the mobile device memory 420 and/or processor 410. In a particular embodiment, the functionality of the chip 180 is incorporated in an element within the mobile device 312 that provides object recognition capabilities to the mobile device 312. Still further, the chip 180 functionality may be included in a removable storage device such as an SD card or the like.

The communication interface 460 may also include an object recognition interface in order to allow a user to execute some or all of the above-described processes with respect to the object recognition application and/or the chip 180. The object recognition interface may have access to the hardware, e.g., the transceiver, and software accessible to the communication interface 460. Furthermore, the object recognition interface may have the ability to connect to and communicate with an external data storage on a separate system within the network as a means of recognizing the object(s) in the video stream.

The processor 410 may be configured to use the communication interface 460 to communicate with one or more other devices on a network. In this regard, the communication interface 460 may include an antenna 476 operatively coupled to a transmitter 474 and a receiver 472 (together a "transceiver"). The processor 410 may be configured to provide signals to and receive signals from the transmitter 474 and receiver 472, respectively. The signals may include signaling information in accordance with the air interface standard of the applicable cellular system of the wireless telephone network that may be part of the network. In this regard, the mobile device 312 may be configured to operate with one or more air interface standards, communication protocols, modulation types, and access types. By way of illustration, the mobile device 312 may be configured to operate in accordance with any of a number of first, second, third, and/or fourth-generation communication protocols and/or the like. For example, the mobile device 312 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, and/or the like. The mobile device 312 may also be configured to operate in accordance with non-cellular communication mechanisms, such as via a WLAN, WAN, GAN, the Internet or other communication/data networks.

As described above, the mobile device 312 may have a user interface that includes user output devices 440B and/or user input devices 440A. The user output devices 440B may include a display 434 (e.g., a liquid crystal display (LCD) or the like) and a speaker 432 or other audio device, which are operatively coupled to the processor 410. The user input devices 440A, which may allow the mobile device 312 to receive data from a user 310, may include any of a number of devices allowing the mobile device 312 to receive data from a user, such as a keypad, keyboard, touch-screen, touchpad, microphone, mouse, joystick, other pointer device, button, soft key, and/or other input device(s).

The mobile device 312 may further include a power source 415. Generally, the power source 415 is a device that supplies electrical energy to an electrical load. In one embodiment, power source 415 may convert a form of energy such as solar energy, chemical energy, mechanical energy, etc. to electrical energy. Generally, the power source 415 in a mobile device 312 may be a battery, such as a lithium battery, a nickel-metal hydride battery, or the like, that is used for powering various circuits, e.g., the transceiver circuit, and other devices that are used to operate the mobile device 312. Alternatively, the power source 415 may be a power adapter that can connect a power supply from a power outlet to the mobile device 312. In such embodiments, a power adapter may be classified as a power source "in" the mobile device.

The mobile device 312 may also include a memory 420 operatively coupled to the processor 410. As used herein, memory may include any computer readable medium configured to store data, code, or other information. The memory 420 may include volatile memory, such as volatile Random Access Memory (RAM) including a cache area for the temporary storage of data. The memory 420 may also include non-volatile memory, which can be embedded and/or may be removable. The non-volatile memory may additionally or alternatively include an electrically erasable programmable read-only memory (EEPROM), flash memory or the like.

The memory 420 may store any of a number of applications or programs which include computer-executable instructions/code executed by the processor 410 to implement the functions of the mobile device 312 described herein. For example, the memory 420 may include such applications as an AR presentation application 421, a web browser application 422, an SMS application, an object recognition application, an email application 424, etc. Although not depicted in FIG. 4, in some embodiments of the invention, memory 420 may store all or part of AR System Application 339 and Identifying Data 338.

As explained earlier, the mobile device 312 may also include a positioning system device 475. In some embodiments, the positioning system device 475 may include a global positioning system (GPS) transceiver that communicates with a GPS satellite. An apparatus (such as the AR apparatus 330 or the mobile device 312) may be able to receive GPS coordinates associated with the mobile device by communicating with the GPS satellite. In some embodiments, the positioning system device 475 is at least partially made up of an antenna, a transmitter, and a receiver. In some embodiments, triangulation of cellular signals may be used to identify the approximate location of the mobile device 312. For instance, an apparatus may be able to identify a cell site, i.e., cell tower that is located close to or closest to the mobile device 312. In still other embodiments, the positioning system device 475 includes a proximity sensor or transmitter, such as an RFID tag, that can sense or be sensed by devices known to be located proximate a merchant or other location to determine that the mobile device 312 is located proximate these devices. In still other embodiments where the mobile device 312 is on a network, an apparatus may identify or receive a network address associated with the mobile device 312. In some embodiments, an apparatus may receive the network address by either 'pinging' the mobile device 312 or some other system on the network that retains information about one or more devices on the network. In some embodiments, the network address is an Internet Protocol (IP) address.

Figure 5:
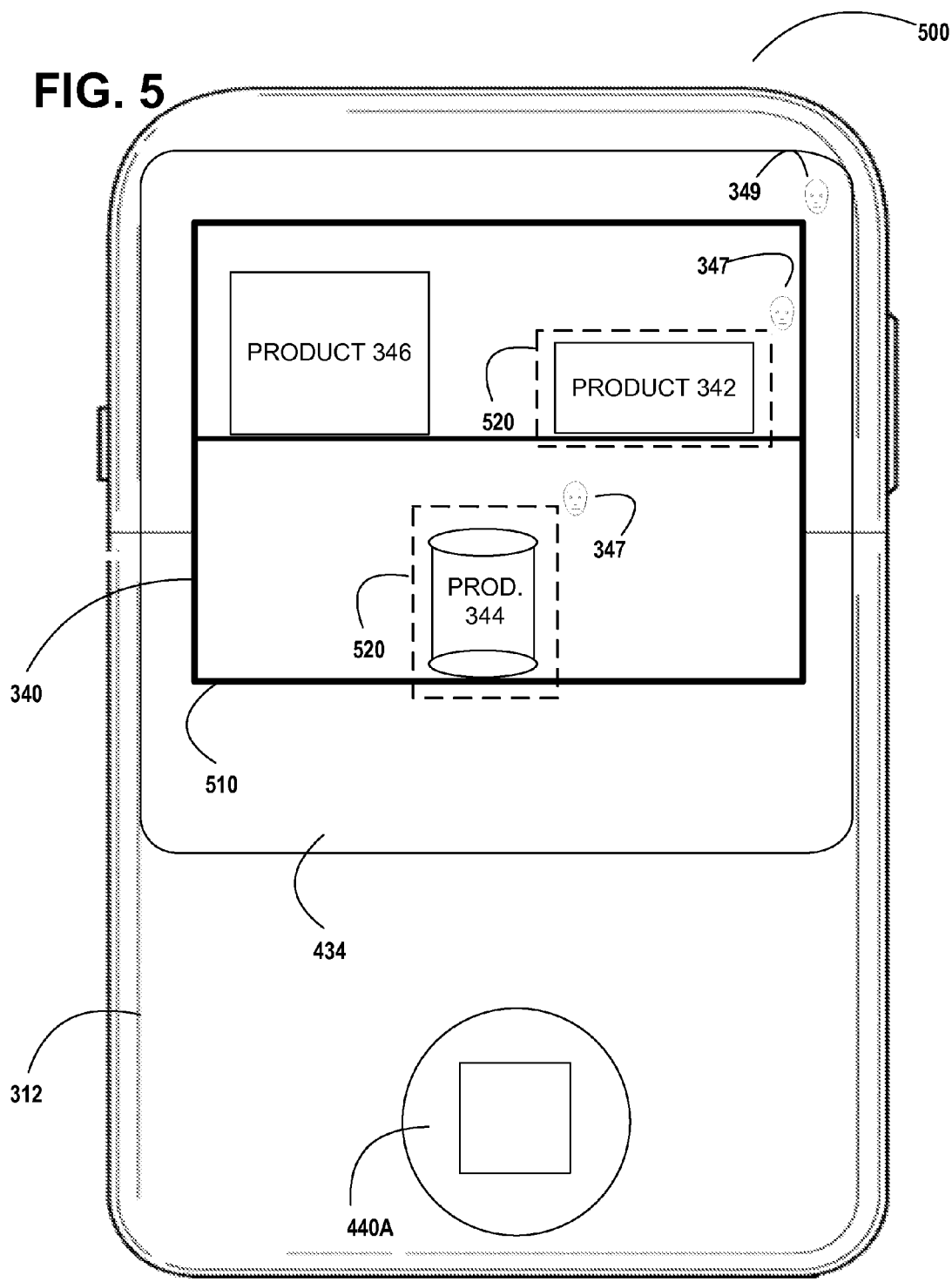

Referring now to FIG. 5, a block diagram 500 illustrates an AR experience in accordance with one embodiment of the present invention, including mobile device 312 and mobile device field of view 340.

Mobile device 312 includes user input device 440A and display 434. As shown in FIG. 5, display 434 is displaying an image of mobile device field of view 340. In this embodiment of the invention, mobile device 312 is capturing a real-time video stream of mobile device field of view 340.

In this embodiment, mobile device field of view 340 includes object 342, object 344, and object 346. In this embodiment, each object may be a product (e.g., an electronic durable good such as a DVD player). Objects 342-346 are located on shelf 510. In this embodiment, mobile device user 310 is located in a store and using mobile device 312 in accordance with all or portions of the process flows described in FIG. 1 and FIG. 2 to determine if objects 342-346 are related to one or more individuals.

FIG. 5 also illustrates indicators 520, which in this embodiment are superimposed over the real-time video stream of mobile device field of view 340, which is displayed on mobile device display 434. The indicator may be superimposed using either an AR application or an object recognition application. In this embodiment, indicators 520 are associated with product 342 and product 344 because a system configured to perform the process described in FIGS. 1 and 2 determined that the image depicts product 342 and product 344, i.e., the system identified both products as objects (see block 110 of FIG. 1). Accordingly, as described in relation to block 130, the system presents, via mobile device 312, indicators 520 associated with product 342 and product 344. Since the system did not identify product 346 as an object, the system did not present an indicator associated with product 346.

Indicators 520 may be any color. In this embodiment, indicators 520 are dashed lines that surround product 342 and product 344. However, in other embodiments of the invention, indicators 520 may take on any shape or size. Furthermore, in other embodiments of the invention, indicator 520 may be a shape that is displayed next to, behind, or in front of the depiction of objects in mobile device display 434.

In some embodiments, the system also automatically presents a thumbnail picture of a face 347 next to the indicator 520. By presenting the "face identifier" near the indicator, the system indicates to the user that there is at least one individual that is related to the object. In some embodiments, the face identifier 347 may be a thumbnail picture of the individual that is determined to be related to the object. In some embodiments, the face identifier 347 is part of the indicator and may also be selectable similar to the indicator 520. In other embodiments, the face identifier 347 may itself be the indicator, and in such embodiments, the system may not present the indicator 520. In some embodiments, the system does not automatically present the face identifier 347 associated with the object; instead, the user may have to select the selectable face identifier 349 that is presented on the mobile display 510. When the user selects the selectable face identifier 349, the system presents the relationship indicators 520 (and face identifiers 347) associated with objects identified from the image that are determined to be related to one or more individuals.

In the embodiment of the invention illustrated in FIG. 5, indicators 520 are selectable. Accordingly, FIG. 6 illustrates an embodiment of the invention when user 310 selects the indicator 520 associated with product 344.

Figure 6:
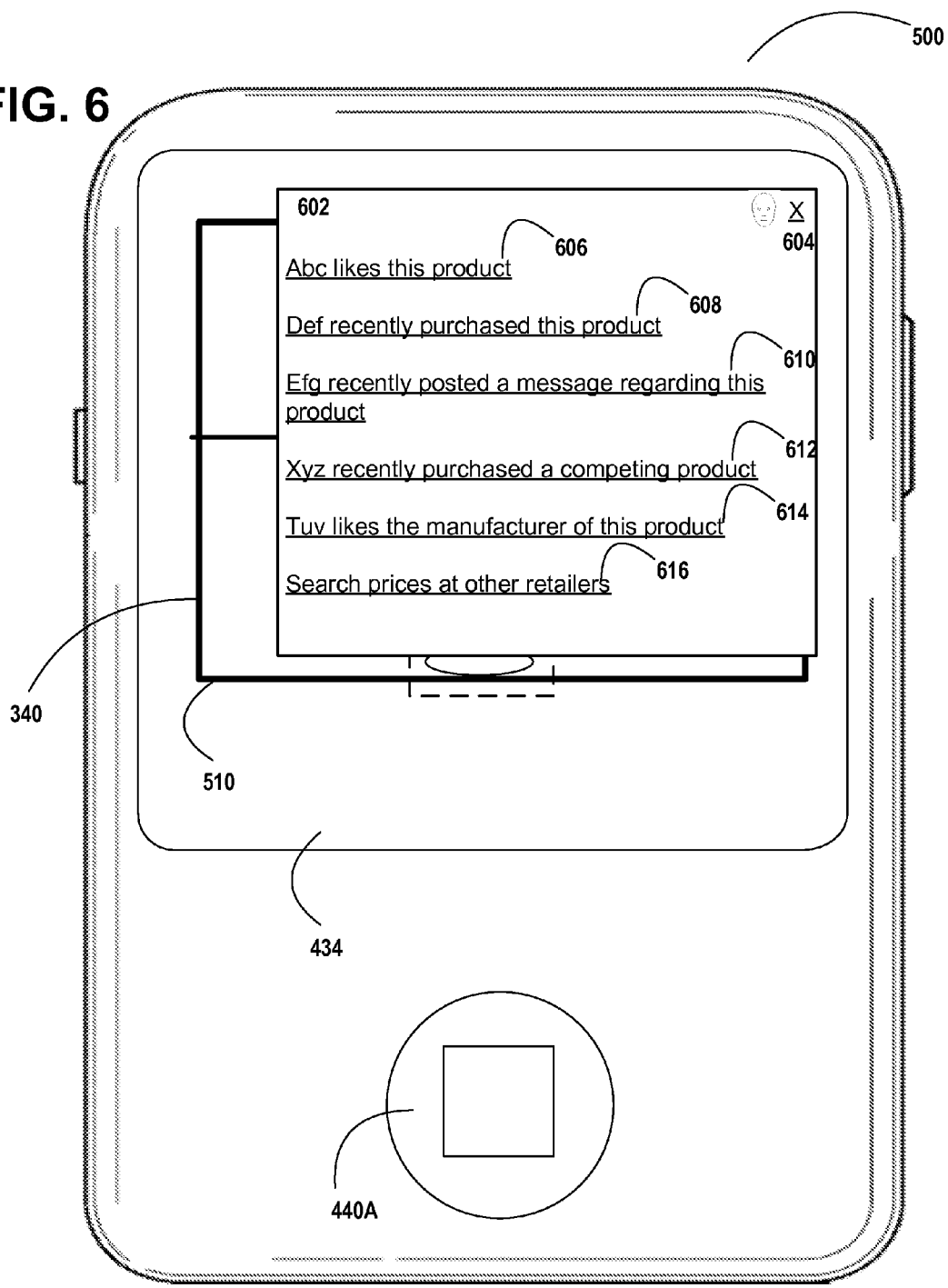

FIG. 6 illustrates window 602, which appears on display 434 when user 310 selects the selectable indicator 520 associated with product 344. Window 602 may include one or more relationships determined or identified by the system. For instance, the system determined that: "Individual "Abc" likes this product" 606, "Individual "Def" recently purchased this product" 608, "Individual "Efg" recently posted a message regarding this product" 610, "Individual "Xyz" recently purchased a competing product" 612, "Individual "Tuv" likes the manufacturer of this product" 614. Each of these messages may be links, which when selected by the user may lead the user to a mobile network page with additional information regarding the chosen link. Additionally, the system also displays a hyperlink to "Search prices at other retailers" 616.

In example embodiments, the system may have determined that "Individual "Abc" likes this product" 606 and that "Individual "Tuv" likes the manufacturer of this product" 614 based on information received from a social network associated with the user. As a further instance, the system may have determined that "Individual "Def" recently purchased this product" 608 and that "Individual "Xyz" recently purchased a competing product" 612 based on transaction history information received from a financial institution. As a further instance, the system may have determined that "Individual "Efg" recently posted a message regarding this product" 610 based on information received from a messaging network. Additionally, the system may have determined that the individuals "Abc," "Def," "Efg," "Xyz," and "Tuv" are associated with the user by automatically scanning a list of contacts associated with the user's social network, the user's contact list (associated with the user's mobile device 312 or a subscriber identity module ("SIM") card associated with the user's mobile device 312), the user's contact list (associated with the user's email), user input etc.

In other embodiments, the system may access an intelligent software agent. The intelligent software agent may automatically, without user input, identify the lowest price offering, customer reviews of the product, customer reviews of the vendor, the shipping costs, etc. In this way, the intelligent software may automatically order the product after the user indicates he would like to purchase the product using the AR application. The product is put into a purchasing queue and the intelligent software agent provides for the remaining transaction requirements.

Window 602 may include any other information, text, or hyperlinks that may be related to product 344, to the individuals related to product 344, or to the relationship between those individuals and the product 344. Window 602 also includes selectable icon 604, which upon being selected by the user, will close window 602. Selectable icon 604 may be in any shape, size, or color.

In this embodiment of the invention, window 602 is presented on top of the depiction of mobile device field of view 340, but as one of ordinary skill in the art will appreciate, window 602 or the information included therein may be presented in many different ways. For instance, in some embodiments, the information included in window 602 may appear integrated into the depiction of mobile device field of view 340, such that the information does not cover up any depiction of mobile device field of view 340. In other embodiments, window 602 or the information included within may take up all or part of display 434 of mobile device 312. In some other embodiments, and especially when indicator 520 is not selectable, the information included within window 602 may be presented to the user on display 434 without having to select any portion of display 434.

For clarification purposes, the information included within window 602 relate to product 344 because window 602 was presented after user 310 selected the selectable indicator 520 associated with product 344. In other embodiments of the invention, the information included within window 602 may relate to different products that are identified as objects and may be presented to the user upon selecting the selectable indicator associated with those different products that are identified as objects.

Figure 7:
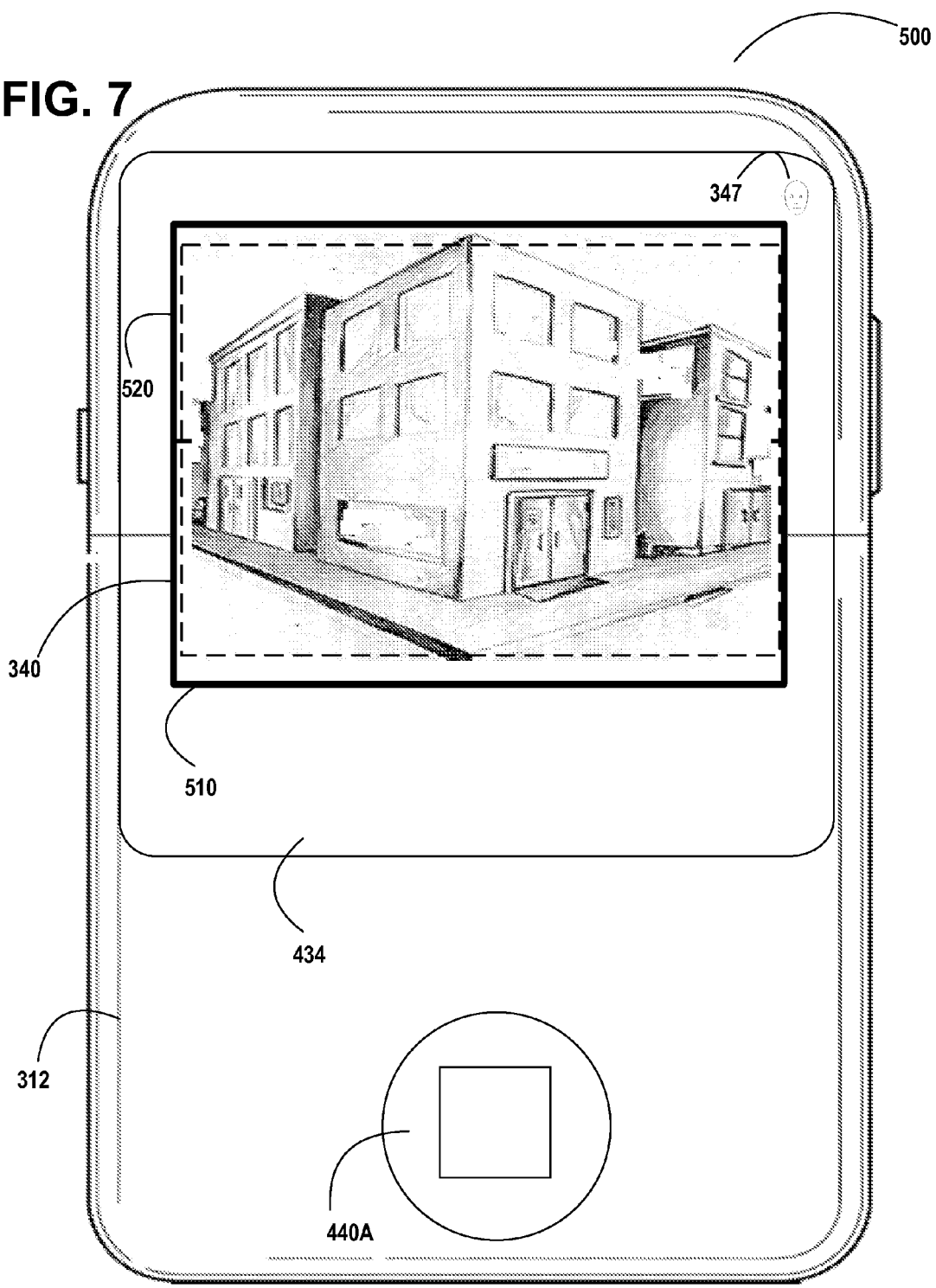

Referring now to FIG. 7, a block diagram 500 illustrates an AR experience in accordance with another embodiment of the present invention, including mobile device 312 and mobile device field of view 340.

Mobile device 312 includes user input device 440A and display 434. As shown in FIG. 7, display 434 is displaying an image of mobile device field of view 340. In this embodiment of the invention, mobile device 312 is capturing a real-time video stream of mobile device field of view 340.

In this embodiment, mobile device field of view 340 includes an object. In this embodiment, the object is a location. In this embodiment, mobile device user 310 is located at a street corner and using mobile device 312 in accordance with all or portions of the process flows described in FIG. 1 and FIG. 2 to determine if the object displayed in the mobile display 510 is related to one or more individuals.

FIG. 7 also illustrates an indicator 520. Here, a system configured to perform the process described in FIGS. 1 and 2 automatically determines that the object depicts an identified location. In some embodiments, the system may makes this location determination by identifying from the image a street sign, or a famous landmark, or a street number that is visible on a local business or a home, etc. In other embodiments, a system makes this location determination using one or more other location determining mechanisms. For example, the system may make this location determination by communicating with a global positioning system (GPS) satellite that receives a signal from a positioning system device located in the mobile device 312. Also as explained with respect to FIG. 4 above, in alternate embodiments, a system makes this location determination by determining a network address associated with the mobile device 312 or by identifying a location of a cell site (or cell tower) that is located closest to the mobile device 312. In some embodiments, one or more of the above location determining mechanisms may be used in combination with each other in order to confirm the accuracy of the location identified by one of the location determining mechanisms.

Additionally, the system configured to perform the process described in FIGS. 1 and 2 automatically determines that the location object is related to at least one individual, and therefore presents an indicator 520. If the system did not automatically determine that the object depicted an identified location, the system may not present the indicator 520. Additionally, since the system automatically determines that the location object displayed in the mobile display 510 is related to at least one individual, the system therefore presents the face identifier 347. If the system did not determine that the object depicted in the image is an identified location, the system would not be able to present the face identifier 347 because the system would not be able to determine individuals who are related to an unidentified location.

Indicators 520 may be any color. In this embodiment, indicators 520 are dashed lines that surround the identified location object. However, in other embodiments of the invention, indicators 520 may take on any shape or size. Furthermore, in other embodiments of the invention, indicator 520 may be a shape that is displayed next to, behind, or in front of the depiction of objects in mobile device display 434.

By presenting the "face identifier" near the indicator, the system indicates to the user that there is at least one individual that is related to the object. In some embodiments, the face identifier 347 is part of the indicator and may also be selectable similar to the indicator 520. In other embodiments, the face identifier 347 may itself be the indicator, and in such embodiments, the system may not present the indicator 520.

In the embodiment of the invention illustrated in FIG. 7, indicator 520 is selectable. Accordingly, FIG. 8 illustrates an embodiment of the invention when user 310 selects the indicator 520 associated with the identified location object.

FIG. 8 illustrates window 602, which appears on display 434 when user 310 selects the selectable indicator 520 associated with the identified location object. Window 602 may include one or more relationships determined or identified by the system. For instance, the system determined that: "Individual "Abc" was recently here on Jan. 1, 2012" 606, "Individual "Def" recently visited ABC Electronics 100 yards from here" 608, "Individual "Efg" recently dined at DEF Restaurant 240 yards from here" 610, or the like. Each of these messages may be links, which when selected by the user may lead the user to a mobile network page with additional information regarding the chosen link. For instance, when the user selects link 608, the user may obtain directions to ABC Electronics, the user may obtain individual "Def's" transaction history with ABC Electronics, the user may obtain reviews of one or more products sold by ABC Electronics, etc.

In example embodiments, the system may have determined the information in links 606, 608, 610 from one or more social networks associated with the user or from one or more messaging networks, or from data collected by one or more financial institutions. Additionally, the system may have determined that the individuals "Abc," "Def," and "Efg" are associated with the user by automatically scanning a list of contacts associated with the user's social network, the user's contact list (associated with the user's mobile device 312 or a SIM card associated with the user's mobile device 312), the user's contact list (associated with the user's email), user input etc.

Window 602 may include any other information, text, or hyperlinks that may be related to the identified location object, to the individuals related to the identified location object, or to the relationship between those individuals and the identified location object. Window 602 also includes selectable icon 604, which upon being selected by the user, will close window 602. Selectable icon 604 may be in any shape, size, or color.

In this embodiment of the invention, window 602 is presented on top of the depiction of mobile device field of view 340, but as one of ordinary skill in the art will appreciate, window 602 or the information included therein may be presented in many different ways. For instance, in some embodiments, the information included in window 602 may appear integrated into the depiction of mobile device field of view 340, such that the information does not cover up any depiction of mobile device field of view 340. In other embodiments, window 602 or the information included within may take up all or part of display 434 of mobile device 312. In some other embodiments, and especially when indicator 520 is not selectable, the information included within window 602 may be presented to the user on display 434 without having to select any portion of display 434.

For clarification purposes, the information included within window 602 relate to the identified location object because window 602 was presented after user 310 selected the selectable indicator 520 associated with the identified location object. In other embodiments of the invention, the information included within window 602 may relate to different locations that are identified as objects and may be presented to the user upon selecting the selectable indicator associated with those different locations that are identified as objects.

The systems, methods, computer program products, etc. described herein, may be utilized or combined with any other suitable AR-related application. Non-limiting examples of other suitable AR-related applications include those described in the following U.S. Provisional Patent Applications, the entirety of each of which is incorporated herein by reference:

| U.S. Provisional Ser. No. | Filed On | Title |
| --- | --- | --- |
| 61/450,213 | Mar. 8, 2011 | Real-Time Video Image Analysis Applications for Commerce Activity |
| 61/478,409 | Apr. 22, 2011 | Presenting Offers on a Mobile Communication Device |
| 61/478,412 | Apr. 22, 2011 | Real-Time Video Analysis for Reward Offers |
| 61/478,394 | Apr. 22, 2011 | Real-Time Video Image Analysis for Providing Targeted Offers |
| 61/478,399 | Apr. 22, 2011 | Real-Time Analysis Involving Real Estate Listings |
| 61/478,402 | Apr. 22, 2011 | Real-Time Video Image Analysis for an Appropriate Payment Account |
| 61/478,405 | Apr. 22, 2011 | Presenting Investment-Related Information on a Mobile Communication Device |
| 61/478,393 | Apr. 22, 2011 | Real-Time Image Analysis for Medical Savings Plans |
| 61/478,397 | Apr. 22, 2011 | Providing Data Associated With Relationships Between Individuals and Images |
| 61/478,408 | Apr. 22, 2011 | Identifying Predetermined Objects in a Video Stream Captured by a Mobile Device |
| 61/478,400 | Apr. 22, 2011 | Real-Time Image Analysis for Providing Health Related Information |
| 61/478,411 | Apr. 22, 2011 | Retrieving Product Information From Embedded Sensors Via Mobile Device Video Analysis |
| 61/478,403 | Apr. 22, 2011 | Providing Social Impact Information Associated With Identified Products or Businesses |
| 61/478,407 | Apr. 22, 2011 | Providing Information Associated With an Identified Representation of an Object |
| 61/478,415 | Apr. 22, 2011 | Providing Location Identification of Associated Individuals Based on Identifying the Individuals in Conjunction With a Live Video Stream |
| 61/478,419 | Apr. 22, 2011 | Vehicle Recognition |
| 61/478,417 | Apr. 22, 2011 | Collective Network of Augmented Reality Users |
| 61/508,985 | Jul. 18, 2011 | Providing Information Regarding Medical Conditions |
| 61/508,946 | Jul. 18, 2011 | Dynamically Identifying Individuals From a Captured Image |
| 61/508,980 | Jul. 18, 2011 | Providing Affinity Program Information |
| 61/508,821 | Jul. 18, 2011 | Providing Information Regarding Sports Movements |
| 61/508,850 | Jul. 18, 2011 | Assessing Environmental Characteristics in a Video Stream Captured by a Mobile Device |
| 61/508,966 | Jul. 18, 2011 | Real-Time Video Image Analysis for Providing Virtual Landscaping |
| 61/508,969 | Jul. 18, 2011 | Real-Time Video Image Analysis for Providing Virtual Interior Design |
| 61/508,971 | Jul. 18, 2011 | Real-Time Video Image Analysis for Providing Deepening Customer Value |
| 61/508,764 | Jul. 18, 2011 | Conducting Financial Transactions Based on Identification of Individuals in an Augmented Reality Environment |
| 61/508,973 | Jul. 18, 2011 | Real-Time Video Image Analysis for Providing Security |
| 61/508,976 | Jul. 18, 2011 | Providing Retail Shopping Assistance |
| 61/508,944 | Jul. 18, 2011 | Recognizing Financial Document Images |

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, etc.), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatuses and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory, etc.) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s)

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A method for providing relationship information in real-time, the method comprising:
   providing an augmented reality (AR) application to a user for installation on a mobile device of the user;
   establishing a communication link with the mobile device of the user, wherein establishing a communication link further comprises establishing a data channel with a storage medium associated with the mobile device;
   capturing, continuously, a real-time video stream of a surrounding environment using a video capture device associated with a mobile device of the user, wherein the real-time video stream comprises an image of one or more goods or service providers;
   receiving the image, wherein receiving further comprises receiving first information associated with the image, wherein the first information comprises an identifiable feature associated with one or more objects in the image and a location of the identifiable feature in the retrieved image, wherein the one or more objects comprises at least a product, a business, and a location, wherein the identifiable feature associated with the product comprises at least a size, a shape, a color of the product's packaging, a product logo, a bar code information, and a product name, wherein the identifiable feature associated with the business comprises a business logo, a decor of the business and one or more trademarks associated with the business, wherein the identifiable feature associated with the location comprises a street sign, an identifiable landmark, a street number and a signal associated with a geographic position device associated with the mobile device;
   receiving second information regarding one or more individuals, wherein receiving further comprises retrieving the second information from at least one or more social media accounts associated with the user, a contact list comprising contact information for the one or more individuals stored on the mobile device of the user, and a user input;
   determining, based at least partially on the first and second information, a plurality of relationships between the one or more individuals and the one or more objects in the image;
   initiating a presentation of a first user interface on the mobile device via the established data channel, wherein initiating activates the AR application to cause the mobile device to display a list of the plurality of relationships between the one or more individuals and the image on the first user interface, wherein the user interface comprises a list of the plurality of relationships between the one or more individuals and the image, wherein the list is prioritized based on a predetermined strength associated with each of the plurality of relationships whereby a relationship with a high strength is ranked higher in the list of the plurality of relationships than a relationship with a low strength;

receiving, via the first user interface on the mobile device and the established data channel associated with the mobile device, a user selection of at least one of the plurality of relationships between the one or more individuals and the image;

initiating, via the established data channel, a presentation of a second user interface for display on the mobile device, wherein the second user interface comprises a relationship information associated with the user selected relationship from the plurality of relationships, wherein presenting the relationship information comprises superimposing the relationship information over a real-time video stream of the one or more individuals that is captured by the mobile device, wherein the real-time video stream comprises at least one of the one or more objects;

determining that the mobile device is associated with at least one trigger event, wherein the trigger event comprises: (i) the mobile device being exposed to predetermined low levels of illumination for a first predetermined extended period of time, (ii) the mobile device being stationary for a second predetermined extended period of time or (iii) a power source of the mobile device being associated with predetermined low power levels;

disengaging the continuous capture of the real-time video stream of the surrounding environment, based on the at least one trigger event; and re-engaging, automatically, the continuous capture of the real-time video stream of the surrounding environment, based on determining that the mobile device is not associated with the at least one trigger event.

2. The method of claim 1, wherein receiving first image further comprises:

identifying one or more objects associated with the image, the image is part of a real-time video stream;

receiving metadata associated with the one or more objects, the received metadata comprises at least location information associated with the one or more objects;

comparing the received metadata associated with the one or more objects with one or more stored metadata in a metadata database, the one or more stored metadata associated with the one or more individuals; and determining a relationship between the image and the one or more individuals based at least partially on comparing the received metadata with the one or more stored metadata.

3. The method of claim 1, wherein the image is a still image captured by a digital camera.

4. The method of claim 1, wherein the first information associated with the image is the image.

5. The method of claim 1, wherein the mobile device is a mobile phone.

6. The method of claim 1, wherein the object is associated with a product.

7. The method of claim 1, wherein the object is associated with a business.

8. The method of claim 1, wherein the object is associated with a location.

9. The method of claim 1, further comprising:

identifying one or more individuals associated with the user.

10. The method of claim 1, wherein the receiving the second information comprises:

identifying one or more objects associated with the image;

receiving metadata associated with the one or more objects, wherein the metadata comprises information associated with the one or more objects;

comparing the received metadata associated with the one or more objects with social network information associated with the one or more individuals; and determining a relationship between the image and the one or more individuals based at least partially on comparing the received metadata with the social network information.

11. The method of claim 1, wherein the receiving the second information comprises:

receiving the second information from a contact list associated with the user.

12. The method of claim 1, wherein the receiving the second information comprises:

receiving the second information from a database that comprises financial transaction history of one or more individuals.

13. The method of claim 12, wherein the transaction history comprises purchase history and return history associated with products and services.

14. The method of claim 1, wherein the receiving the second information comprises:

receiving the second information from one or more message sharing networks.

15. The method of claim 1, wherein the receiving the second information comprises:

allowing the user to input the second information, wherein the second information comprises a name of an individual.

16. The method of claim 15, further comprising:

searching, on a network, for information associated with the individual.

17. The method of claim 1, wherein the determining the relationship comprises:

comparing the first information with the second information; and determining a match between the first information and the second information.

18. The method of claim 17, wherein the determining a match comprises:

determining that an individual associated with the second information made a transaction associated with an object depicted in the first information.

19. The method of claim 17, wherein the determining a match comprises:

determining that an individual associated with the second information shared a message associated with an object depicted in the first information.

20. The method of claim 17, wherein the determining a match comprises:

determining that an individual associated with the second information was located at an object depicted in the first information.

21. The method of claim 1, wherein presenting the relationship information comprises:

displaying a relationship indicator on a display of the mobile device.

22. The method of claim 21, wherein the relationship indicator comprises a border that surrounds a depiction of an object.

23. The method of claim 21, wherein the relationship indicator is selectable by the user.

24. The method of claim 23, wherein the relationship indicator, upon being selected, provides information about an object associated with the image.

25. The method of claim 23, wherein the relationship indicator, upon being selected, provides information about the individual.

26. An apparatus for providing relationship information in real-time, the apparatus comprising:
a memory;
a processor; and
a module stored in the memory, executable by the processor, and configured to:
provide an augmented reality (AR) application to a user for installation on a mobile device of the user;
establish a communication link with the mobile device of the user, wherein establishing a communication link further comprises establishing a data channel with a storage medium associated with the mobile device;
capture continuously, a real-time video stream of a surrounding environment using a video capture device associated with a mobile device of the user, wherein the real-time video stream comprises an image of one or more goods or service providers;
receive the image, wherein receiving further comprises receiving first information associated with the image, wherein the first information comprises an identifiable feature associated with one or more objects in the image and a location of the identifiable feature in the retrieved image, wherein the one or more objects comprises at least a product, a business, and a location, wherein the identifiable feature associated with the product comprises at least a size, a shape, a color of the product's packaging, a product logo, a bar code information, and a product name, wherein the identifiable feature associated with the business comprises a business logo, a decor of the business and one or more trademarks associated with the business, wherein the identifiable feature associated with the location comprises a street sign, an identifiable landmark, a street number and a signal associated with a geographic position device associated with the mobile device;
receive second information regarding one or more individuals, wherein receiving further comprises retrieving the second information from at least one or more social media accounts associated with the user, a contact list comprising contact information for the one or more individuals stored on the mobile device of the user, and a user input;
determine, based at least partially on the first and second information, a plurality of relationships between the one or more individuals and the one or more objects in the image;
initiate a presentation of a first user interface on the mobile device via the established data channel, wherein initiating activates the AR application to cause the mobile device to display a list of the plurality of relationships between the one or more individuals and the image on the first user interface, wherein the user interface comprises a list of the plurality of relationships between the one or more individuals and the image, wherein the list is prioritized based on a predetermined strength associated with each of the plurality of relationships whereby a relationship with a high strength is ranked higher in the list of the plurality of relationships than a relationship with a low strength;
receive, via the first user interface on the mobile device and the established data channel associated with the mobile device, a user selection of at least one of the plurality of relationships between the one or more individuals and the image;
initiate, via the established data channel, a presentation of a second user interface for display on the mobile device, wherein the second user interface comprises a relationship information associated with the user selected relationship from the plurality of relationships, wherein presenting the relationship information comprises superimposing the relationship information over a real-time video stream of the one or more individuals that is captured by the mobile device, wherein the real-time video stream comprises at least one of the one or more objects;
determine that the mobile device is associated with at least one trigger event, wherein the trigger event comprises: (i) the mobile device being exposed to predetermined low levels of illumination for a first predetermined extended period of time, (ii) the mobile device being stationary for a second predetermined extended period of time or (iii) a power source of the mobile device being associated with predetermined low power levels;
disengage the continuous capture of the real-time video stream of the surrounding environment, based on the at least one trigger event; and
re-engage, automatically, the continuous capture of the real-time video stream of the surrounding environment, based on determining that the mobile device is not associated with the at least one trigger event.

27. The apparatus of claim 26, wherein the module is further configured to cause the processor to:
identify one or more objects associated with the image, wherein the image is part of a real-time video stream;
receive metadata associated with the one or more objects, the received metadata comprises at least location information associated with the one or more objects;
compare the received metadata associated with the one or more objects with one or more stored metadata in a metadata database, the one or more stored metadata associated with the one or more individuals; and
determine a relationship between the image and the one or more individuals based at least partially on comparing the received metadata with the one or more stored metadata.

28. The apparatus of claim 26, wherein the image is a still image captured by a digital camera.

29. The apparatus of claim 26, wherein the first information associated with the image is the image.

30. The apparatus of claim 26, wherein the mobile device is a mobile phone.

31. The apparatus of claim 26, wherein the object is associated with a product.

32. The apparatus of claim 26, wherein the object is associated with a business.

33. The apparatus of claim 26, wherein the object is associated with a location.

34. The apparatus of claim 26, wherein the module is further configured to:
identify one or more individuals associated with the user.

35. The apparatus of claim 26, wherein the module configured to receive the second information is further configured to:
identify one or more objects associated with the image;
receive metadata associated with the one or more objects, wherein the metadata comprises information associated with the one or more objects;

compare the received metadata associated with the one or more objects with social network information associated with the one or more individuals; and determine a relationship between the image and the one or more individuals based at least partially on comparing the received metadata with the social network information.

36. The apparatus of claim 26, wherein the module configured to receive the second information is further configured to:

receive the second information from a contact list associated with the user.

37. The apparatus of claim 26, wherein the module configured to receive the second information is further configured to:

receive the second information from a database that comprises financial transaction history of one or more individuals.

38. The apparatus of claim 37, wherein the transaction history comprises purchase history and return history associated with products and services.

39. The apparatus of claim 26, wherein the module configured to receive the second information is further configured to:

receive the second information from one or more message sharing networks.

40. The apparatus of claim 26, wherein the module configured to receive the second information is further configured to:

allow the user to input the second information, wherein the second information comprises a name of an individual.

41. The apparatus of claim 40, wherein the module is further configured to:

search, on a network, for information associated with the individual.

42. The apparatus of claim 26, wherein the module configured to determine the relationship is further configured to:

compare the first information with the second information; and determine a match between the first information and the second information.

43. The apparatus of claim 42, wherein the module configured to determine a match is further configured to:

determine that an individual associated with the second information made a transaction associated with an object depicted in the first information.

44. The apparatus of claim 42, wherein the module configured to determine a match is further configured to:

determine that an individual associated with the second information shared a message associated with an object depicted in the first information.

45. The apparatus of claim 42, wherein the module configured to determine a match is further configured to:

determine that an individual associated with the second information was located at an object depicted in the first information.

46. The apparatus of claim 26, wherein the module configured to present the relationship information is further configured to:

display a relationship indicator on a display of the mobile device.

47. The apparatus of claim 46, wherein the relationship indicator comprises a border that surrounds a depiction of an object.

48. The apparatus of claim 46, wherein the relationship indicator is selectable by the user.

49. The apparatus of claim 48, wherein the relationship indicator, upon being selected, provides information about an object associated with the image.

50. The apparatus of claim 48, wherein the relationship indicator, upon being selected, provides information about the individual.

51. An computer program product for providing relationship information in real-time, the computer program product comprising:

a non-transitory computer-readable medium comprising a set of codes for causing a computer to:

provide an augmented reality (AR) application to a user for installation on a mobile device of the user;

establish a communication link with the mobile device of the user, wherein establishing a communication link further comprises establishing a data channel with a storage medium associated with the mobile device;

capture continuously, a real-time video stream of a surrounding environment using a video capture device associated with a mobile device of the user, wherein the real-time video stream comprises an image of one or more goods or service providers;

receive the image, wherein receiving further comprises receiving first information associated with the image, wherein the first information comprises an identifiable feature associated with one or more objects in the image and a location of the identifiable feature in the retrieved image, wherein the one or more objects comprises at least a product, a business, and a location, wherein the identifiable feature associated with the product comprises at least a size, a shape, a color of the product's packaging, a product logo, a bar code information, and a product name, wherein the identifiable feature associated with the business comprises a business logo, a decor of the business and one or more trademarks associated with the business, wherein the identifiable feature associated with the location comprises a street sign, an identifiable landmark, a street number and a signal associated with a geographic position device associated with the mobile device;

receive second information regarding one or more individuals, wherein receiving further comprises retrieving the second information from at least one or more social media accounts associated with the user, a contact list comprising contact information for the one or more individuals stored on the mobile device of the user, and a user input;

determine, based at least partially on the first and second information, a plurality of relationships between the one or more individuals and the one or more objects in the image;

initiate a presentation of a first user interface on the mobile device via the established data channel, wherein initiating activates the AR application to cause the mobile device to display a list of the plurality of relationships between the one or more individuals and the image on the first user interface, wherein the user interface comprises a list of the plurality of relationships between the one or more individuals and the image, wherein the list is prioritized based on a predetermined strength associated with each of the plurality of relationships whereby a relationship with a high strength is ranked higher in the list of the plurality of relationships than a relationship with a low strength;

receive, via the first user interface on the mobile device and the established data channel associated with the mobile device, a user selection of at least one of the plurality of relationships between the one or more individuals and the image;

initiate, via the established data channel, a presentation of a second user interface for display on the mobile device, wherein the second user interface comprises a relationship information associated with the user selected relationship from the plurality of relationships, wherein presenting the relationship information comprises superimposing the relationship information over a real-time video stream of the one or more individuals that is captured by the mobile device, wherein the real-time video stream comprises at least one of the one or more objects;

determine that the mobile device is associated with at least one trigger event, wherein the trigger event comprises: (i) the mobile device being exposed to predetermined low levels of illumination for a first predetermined extended period of time, (ii) the mobile device being stationary for a second predetermined extended period of time or (iii) a power source of the mobile device being associated with predetermined low power levels;

disengage the continuous capture of the real-time video stream of the surrounding environment, based on the at least one trigger event; and re-engage, automatically, the continuous capture of the real-time video stream of the surrounding environment, based on determining that the mobile device is not associated with the at least one trigger event.

52. The computer program product of claim 51 further comprises:

identify one or more objects associated with the image, wherein the image is part of a real-time video stream;

receive metadata associated with the one or more objects, the received metadata comprises at least location information associated with the one or more objects;

compare the received metadata associated with the one or more objects with one or more stored metadata in a metadata database, the one or more stored metadata associated with the one or more individuals; and determine a relationship between the image and the one or more individuals based at least partially on comparing the received metadata with the one or more stored metadata.

53. The computer program product of claim 51, wherein the image is a still image captured by a digital camera.

54. The computer program product of claim 51, wherein the first information associated with the image is the image.

55. The computer program product of claim 51, wherein the mobile device is a mobile phone.

56. The computer program product of claim 51, wherein the object is associated with a product.

57. The computer program product of claim 51, wherein the object is associated with a business.

58. The computer program product of claim 51, wherein the object is associated with a location.

59. The apparatus of claim 51, wherein the set of codes further causes a computer to:

identify one or more individuals associated with the user.

60. The computer program product of claim 51, wherein the set of codes that cause a computer to receive the second information further causes a computer to:

identifying one or more objects associated with the image;

receiving metadata associated with the one or more objects, wherein the metadata comprises information associated with the one or more objects;

comparing the received metadata associated with the one or more objects with social network information associated with the one or more individuals; and determining a relationship between the image and the one or more individuals based at least partially on comparing the received metadata with the social network information.

61. The computer program product of claim 51, wherein the set of codes that cause a computer to receive the second information further causes a computer to:

receive the second information from a contact list associated with the user.

62. The computer program product of claim 51, wherein the set of codes that cause a computer to receive the second information further causes a computer to:

receive the second information from a database that comprises financial transaction history of one or more individuals.

63. The computer program product of claim 62, wherein the transaction history comprises purchase history and return history associated with products and services.

64. The computer program product of claim 51, wherein the set of codes that cause a computer to receive the second information further causes a computer to:

receive the second information from one or more message sharing networks.

65. The computer program product of claim 51, wherein the set of codes that cause a computer to receive the second information further causes a computer to:

allow the user to input the second information, wherein the second information comprises a name of an individual.

66. The computer program product of claim 65, wherein the set of codes further causes a computer to:

search, on a network, for information associated with the individual.

67. The computer program product of claim 51, wherein the set of codes that cause a computer to determine the relationship further cause a computer to:

compare the first information with the second information; and determine a match between the first information and the second information.

68. The computer program product of claim 67, wherein the set of codes that cause a computer to determine a match further cause a computer to:

determine that an individual associated with the second information made a transaction associated with an object depicted in the first information.

69. The computer program product of claim 67, wherein the set of codes that cause a computer to determine a match further cause a computer to:

determine that an individual associated with the second information shared a message associated with an object depicted in the first information.

70. The computer program product of claim 67, wherein the set of codes that cause a computer to determine a match further cause a computer to:

determine that an individual associated with the second information was located at an object depicted in the first information.

71. The computer program product of claim 51, wherein the set of codes that cause a computer to present the relationship information further cause a computer to:

display a relationship indicator on a display of the mobile device.

72. The computer program product of claim 71, wherein the relationship indicator comprises a border that surrounds a depiction of an object.

73. The computer program product of claim 71, wherein the relationship indicator is selectable by the user.

74. The computer program product of claim 73, wherein the relationship indicator, upon being selected, provides information about an object associated with the image.

75. The computer program product of claim 73, wherein the relationship indicator, upon being selected, provides information about the individual.

* * * * *